(12) United States Patent
Miyauchi et al.

(10) Patent No.: US 7,885,029 B2
(45) Date of Patent: Feb. 8, 2011

(54) THERMALLY-ASSISTED MAGNETIC RECORDING HEAD AND THERMALLY-ASSISTED MAGNETIC RECORDING METHOD

(75) Inventors: Daisuke Miyauchi, Tokyo (JP); Susumu Aoki, Tokyo (JP); Seiichi Takayama, Tokyo (JP); Koji Shimazawa, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 64 days.

(21) Appl. No.: 12/423,269

(22) Filed: Apr. 14, 2009

(65) Prior Publication Data

US 2010/0259845 A1    Oct. 14, 2010

(51) Int. Cl.
    *G11B 5/02* (2006.01)
(52) U.S. Cl. .................. 360/59; 369/13.33; 369/13.13
(58) Field of Classification Search ............ 360/59; 369/13.33, 13.32, 13.13, 112.09, 112.14, 369/112.21, 112.27; 385/129, 31, 88–94; 250/201.3, 201.5
    See application file for complete search history.

(56) References Cited

U.S. PATENT DOCUMENTS

| | | | |
|---|---|---|---|
| 6,636,460 B2 | 10/2003 | Akiyama et al. | |
| 6,649,894 B2 | 11/2003 | Matsumoto et al. | |
| 6,768,556 B1 | 7/2004 | Matsumoto et al. | |
| 7,821,732 B2* | 10/2010 | Komura et al. | 369/13.33 |
| 2007/0153417 A1* | 7/2007 | Suh et al. | 360/59 |
| 2010/0061200 A1* | 3/2010 | Shimazawa et al. | 369/13.33 |
| 2010/0073802 A1* | 3/2010 | Komura et al. | 360/59 |
| 2010/0118431 A1* | 5/2010 | Tomikawa et al. | 360/59 |

FOREIGN PATENT DOCUMENTS

| JP | A-2005-004901 | 1/2005 |
|---|---|---|
| JP | A-2005-190655 | 7/2005 |

\* cited by examiner

*Primary Examiner*—Tan X Dinh
(74) *Attorney, Agent, or Firm*—Oliff & Berridge, PLC

(57) ABSTRACT

A head capable of favorite thermally-assisted magnetic recording without depending on the use of a near-field light generator is provided. The head comprises a write head element formed on the trailing side from a waveguide and comprising a first main pole. The first main pole and the waveguide are opposed to each other through a first clad layer, and a second clad layer is provided on a rear side from the first main pole. This gives that the end surface of the waveguide can be placed much close to the end surface of the first main pole apart by only a thickness of the first clad layer. As a result, the end surface of the first main pole can apply a sufficient intensity of write field to the intensity center and its vicinity of the light spot formed on the magnetic recording layer.

19 Claims, 13 Drawing Sheets

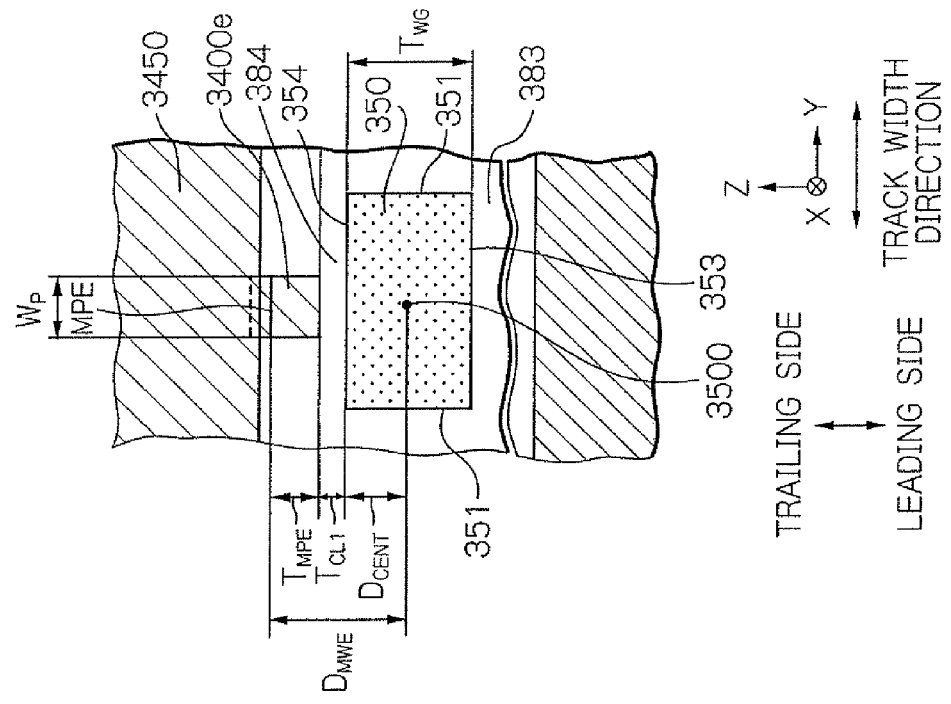
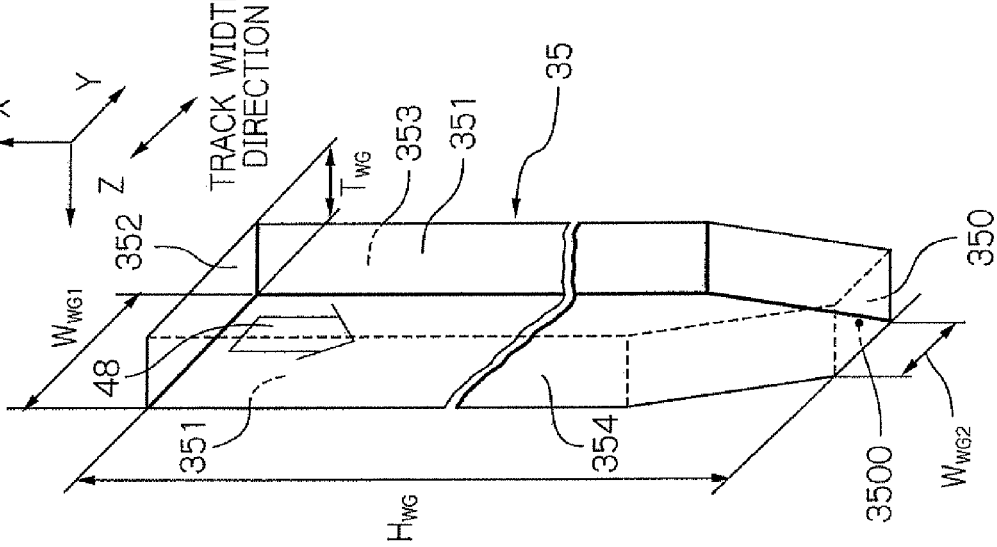
Fig. 6a
Fig. 6b

Fig. 8
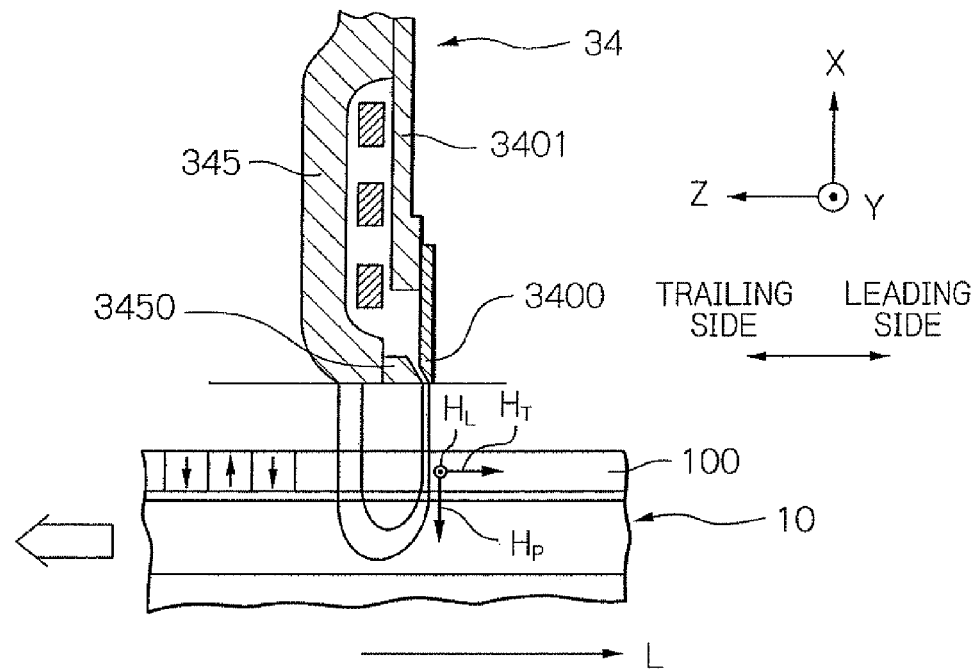
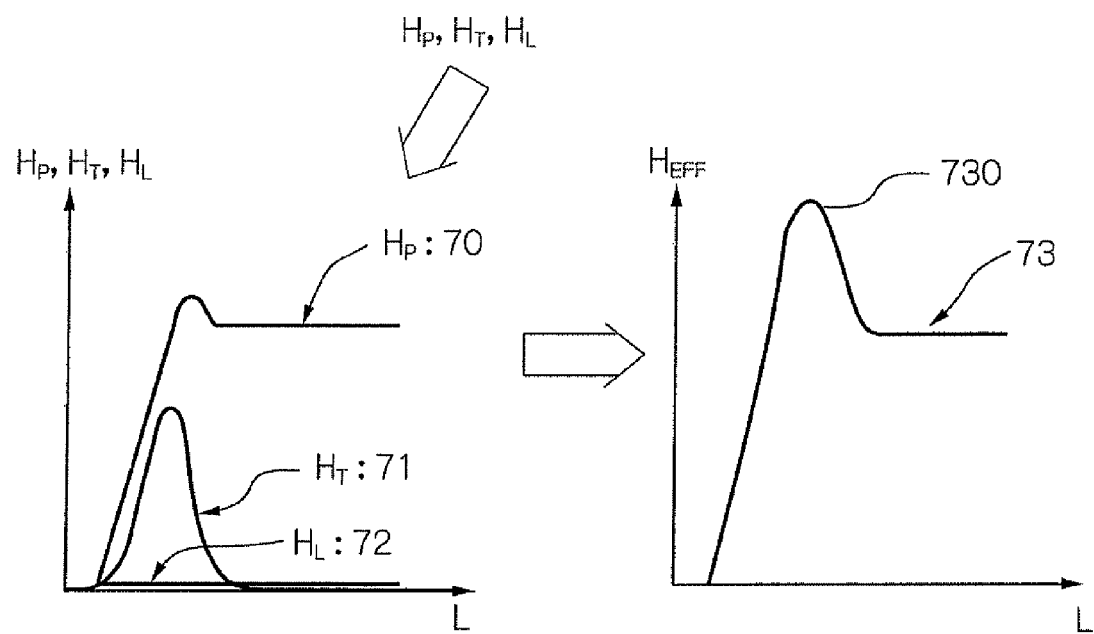

THERMALLY-ASSISTED MAGNETIC RECORDING HEAD AND THERMALLY-ASSISTED MAGNETIC RECORDING METHOD

BACKGROUND OF THE INVENTION

1. Field of the Invention

The present invention relates to a thermally-assisted magnetic recording method in which a magnetic recording medium is irradiated with light, thereby anisotropic magnetic field of the medium is lowered, then, magnetic recording is performed. Further, the present invention relates to a thermally-assisted magnetic recording head which writes data by using the thermally-assisted magnetic recording method.

2. Description of the Related Art

As the recording density of a magnetic recording apparatus, as represented by a magnetic disk apparatus, becomes higher, further improvement has been required in the performance of a thin-film magnetic head and a magnetic recording medium. As the thin-film magnetic head, a composite-type thin-film magnetic head is widely used, which has a stacked structure of a magnetoresistive (MR) element for reading data and an electromagnetic transducer for writing data.

Whereas, the magnetic recording medium is generally a kind of discontinuous body of magnetic microparticles gathered together, and each of the magnetic microparticles has a single magnetic domain structure. Here, one record bit consists of a plurality of the magnetic microparticles. Therefore, in order to improve the recording density, it is necessary to decrease the size of the magnetic microparticles and reduce irregularity in the boundary of the record bit. However, the decrease in size of the magnetic microparticles raises a problem of degradation in thermal stability of the magnetization due to the decrease in volume.

As a measure against the thermal stability problem, it may be possible to increase the magnetic anisotropy energy $K_U$ of the magnetic microparticles. However, the increase in energy $K_U$ causes the increase in anisotropic magnetic field (coercive force) of the magnetic recording medium. Whereas, write field intensity of the thin-film magnetic head is limited by the amount of saturation magnetic flux density of the soft-magnetic material of which the magnetic core of the head is formed. Therefore, the head cannot write data to the magnetic recording medium when the anisotropic magnetic field of the medium exceeds the write field limit.

Recently, as a method for solving the problem of thermal stability, so-called a thermally-assisted magnetic recording technique is proposed. In the technique, a magnetic recording medium formed of a magnetic material with a large energy $K_U$ is used so as to stabilize the magnetization; anisotropic magnetic field of the medium is reduced by applying heat to a portion of the medium, where data is to be written; just after that, writing is performed by applying write field to the heated portion.

As generally-known thermally-assisted magnetic recording techniques, U.S. Pat. No. 6,768,556 and U.S. Pat. No. 6,649,894 disclose a method in which a near-field light generator that is a conductive plate, so-called a plasmon antenna, is disposed in the opposed-to-medium surface, then the magnetic recording medium is heated by using near-field light generated from the plasmon antenna when its portion opposite to the medium is radiated with light.

However, when such a near-field light generator is used to implement thermally-assisted magnetic recording, a difficult problem could arise as described below.

While a plasmon antenna converts received light to near-field light as described above, it is known that the light use efficiency is not so high; most part of the applied light changes to thermal energy in the plasmon antenna. Here, the size of the plasmon antenna is set to a value less than or equal to the wavelength of the light, thus its volume is very small. Accordingly, the thermal energy heats the plasmon antenna to an extremely high temperature; in some cases, the temperature of the plasmon antenna reaches 500° C. (degrees Celsius). Such temperature rise causes the plasmon antenna to thermally expand and protrude from the opposed-to-medium surface toward a magnetic recording medium. As a result, the end, which reaches the opposed-to-medium surface, of a read head element for reading data signal or servo signal from the magnetic recording medium can become relatively far apart from the magnetic recording medium. If this is the case, it will be difficult to properly read the servo signal during writing in which the plasmon antenna is used to irradiate the magnetic recording medium with near-field light. In addition, the electrical resistance of the plasmon antenna increases to a considerably high value at such extremely high temperature. This means that the light use efficiency of the plasmon antenna described above can be further degraded because of increased thermal disturbance of free electrons in the plasmon antenna.

Another problem could arise in the case of combining the plasmon antenna and the main magnetic pole of a write head element. In a thermally-assisted magnetic recording, a plasmon antenna must be disposed sufficiently close to a main magnetic pole, whether on the trailing side or on the leading side of the main magnetic pole. Actually, the thermally-assisted magnetic recording that uses the plasmon antenna applies thermal-dominant technique in which spatial resolution of record bits depends on the spot diameter of near-field light. Therefore, temperature gradient adjacent to the irradiating center of near-field light becomes significantly large. While, magnetic-field gradient of write field generated from the main magnetic pole is set to be considerably large according to the higher recording density. As a result, in writing record bits, the plasmon antenna, or the irradiating center of near-field light, is required to be sufficiently close to the main magnetic pole in order to obtain write field with sufficient intensity near the irradiating center.

However, the plasmon antenna generates near-field light by receiving light that has propagated through a waveguide structure. The waveguide structure generally consists of a core region having a high refractive index and a clad region having a lower refractive index which surrounds the core region. To keep function as the waveguide, the thickness of each region is set comparable with the wavelength of the light. As a result, it is difficult that the plasmon antenna, which is provided so as to be opposed to the core region at the end on the opposed-to-medium surface side of the waveguide structure, is disposed sufficiently close to the main magnetic pole with a distance less than the wavelength of the light.

From above-described considerations, a thermally-assisted magnetic recording without using a near-field light generator is expected. For example, U.S. Pat. No. 6,636,460 B2 discloses a magnetic recording apparatus in which a semiconductor light-emitting element is provided on the leading side of the main magnetic pole instead of a plasmon antenna. The apparatus heats a portion of the magnetic recording medium by laser light spot generated from the semiconductor light-emitting element to lower coercive force of the portion. Then, recording is performed by applying magnetic field generated from the main magnetic pole to the portion with lowered coercive force. In the recording, a reversing point of magnetization in which the intensity of coercive force is equal to the intensity of write field is set in the magnetic pole region; thus, the recording is performed by positively utilizing the temperature gradient instead of the magnetic field gradient.

However, it is difficult to realize favorable thermally-assisted magnetic recording by just using a laser light spot with a large diameter. For example, in the case that the laser light spot is located on the leading side of the main magnetic pole, the magnetization transition of record bits is eventually decided under the condition that both of the temperature and magnetic field gradients are small. Therefore, it is very difficult to achieve a high linear recording density. While, in the case that the laser light spot is located on the trailing side of the main magnetic pole, record bits may be damaged, because the magnetization transition regions of record bits, which were decided in the meantime, are disturbed by being exposed to higher temperature after the decision.

Further, in the case of utilizing the laser light spot with a large diameter, a sufficient intensity of write field must be applied to the center of the laser light spot and its neighborhood to write record bits. For this purpose, the core region of the waveguide structure is needed to be sufficiently close to the main magnetic pole. However, the small distance between the core and the main magnetic pole is equivalent to a thin clad region. This may cause a problem that the light propagating through the core region can be easily absorbed into the main magnetic pole. The light propagating through the core region should reach the magnetic recording medium with a loss as low as possible to realize favorable thermally-assisted magnetic recording. Therefore, the absorption should be avoided as much as possible.

SUMMARY OF THE INVENTION

Therefore, an object of the present invention is to provide a thermally-assisted magnetic recording head capable of favorite thermally-assisted magnetic recording without depending on the use of a near-field light generator, in which the absorption of light propagating through the waveguide by the main magnetic pole is suppressed sufficiently, and to provide a head gimbal assembly (HGA) having the head, and to provide an magnetic recording apparatus having the HGA.

Another object of the present invention is to provide a thermally-assisted magnetic recording head capable of forming stable record bits pattern having steep magnetization transition regions without depending on the use of a near-field light generator, and to provide a head gimbal assembly (HGA) having the head, and to provide an magnetic recording apparatus having the HGA.

Further, another object of the present invention is to provide a thermally-assisted magnetic recording method, which can form stable record bits pattern having steep magnetization transition regions without depending on the irradiation of near-field light.

Some terms used in the specification will be defined before explaining the present invention. In a layered structure or an element structure formed in the element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to the trailing side and −Z side to the leading side. And Y-axis direction indicates the track width direction, and X-axis direction indicates the height direction.

According to the present invention, a thermally-assisted magnetic recording head is provided, which comprises, a waveguide for guiding a light for thermal-assist to a magnetic recording medium, formed on an element-formation surface of a substrate and extending to an opposed-to-medium surface of the head; and a write head element formed on the trailing side from the waveguide and comprising: a main magnetic pole for applying a write magnetic field to the magnetic recording medium; and an auxiliary magnetic pole provided on the trailing side of the main magnetic pole, the main magnetic pole comprising: a first main pole extending to the opposed-to-medium surface; and a second main pole provided on the end portion of the first main pole, the end portion being on the opposite side to the opposed-to-medium surface, and the waveguide and the first main pole being opposed to each other through a first clad layer that acts as a clad for propagation of the light, and a second clad layer that acts as a clad for propagation of the light being provided on the first clad layer and on a rear side from the first main pole when viewed from the opposed-to-medium surface side.

In this thermally-assisted magnetic recording head, the end surface of the waveguide reaching the opposed-to-medium surface can be placed much close to the end surface of the first main pole reaching the opposed-to-medium surface, apart by only a distance that is a thickness of the first clad layer. As a result, during writing record bits, the end surface of the first main pole can apply a sufficient intensity of write field to the intensity center and its vicinity of the light spot formed on the magnetic recording layer of the magnetic disk, which is irradiated with laser light emitted from the end surface of the waveguide. Accordingly, there can be formed stable record bits pattern having steep magnetization transition regions.

Further, the range of the region where the waveguide and the first main pole are opposed to each other is limited to the length of the first main pole in the direction perpendicular to the opposed-to-medium surface. And the other portion of the waveguide, which is not opposed to the first main pole, extends along with a clad having sufficient thickness, the clad including at least the first clad layer and the second clad layer. Therefore, the clad fulfills its function; thus, there can be suppressed the increase of propagation loss of laser light propagating through the waveguide.

In the thermally-assisted magnetic recording head according to the present invention, the length of the first main pole in a direction perpendicular to the opposed-to-medium surface is preferably 3 µm (micrometers) or more, and 4 µm or less. And the thickness of the first clad layer is preferably 10 nm (nanometers) or more, and 100 nm (nanometers) or less. Further, a third clad layer is preferably provided between the second clad layer and the second main pole. In this case, the thickness of the third clad layer is preferably at least 0.4 µm. Further in this case, the end of the third clad layer on the opposed-to-medium surface side is preferably recessed by a predetermined distance from the end of the first main pole when viewed from the opposed-to-medium surface side, the end of the first main pole being on an opposite side to the opposed-to-medium surface. The setting of the predetermined distance can secure a joint area needed for obtaining adequate magnetic coupling between the first main pole and the second main pole during head manufacturing process. That is, there can be avoided a situation in which the formation of the third clad layer limits the magnetic coupling. As a result, a sufficient intensity of write field can be generated from the first main pole. In this case, the predetermined distance is preferably 1 µm or more, and 2 µm or less.

Further, in the thermally-assisted magnetic recording head according to the present invention, it is preferable that the end portion of the first main pole on the opposed-to-medium surface side has a width in a track width direction smaller than those of the other portions, and is tapered in a stacking direction in such a way as to have an inclined surface reaching the opposed-to-medium surface on the trailing side of the end portion. In this structure, the trailing edge of the first main pole is also an edge of the inclined surface; thus is positioned more on the leading side compared to the case without the inclined surface. As a result, the trailing edge as a writing position can be provided closer to the end surface of the waveguide under the condition that the first main pole keeps a sufficient volume needed as a magnetic path. Furthermore, a light source for emitting the light for thermal-assist is preferably provided on or near the end surface of the waveguide on the opposite side to the opposed-to-medium surface.

Moreover, in the thermally-assisted magnetic recording head according to the present invention, it is preferable that an effective write field profile has a protruded portion on the trailing side, the effective write field profile being an intensity distribution of the write magnetic field generated from the first main pole, with respect to positions along a track in a recording layer of the magnetic recording medium, and that an anisotropic field profile traverses the protruded portion of the effective write field profile, the anisotropic field profile being a distribution of anisotropic magnetic field with respect to positions along a track in the recording layer when a portion of the recording layer is irradiated directly with light emitted from the waveguide; thus an anisotropic magnetic field of the portion is decreased. In this case, a minimum value $HK_{MIN}$ of anisotropic magnetic field in the anisotropic field profile preferably satisfies a condition: $HK_{MIN} > EH_{MIN}$, where $EH_{MIN}$ is a minimum value of write magnetic field in a range between both edges of the write field profile.

According to the present invention, an HGA is further provided, which comprises a suspension and the above-described thermally-assisted magnetic recording head fixed on the suspension.

According to the present invention, a magnetic recording apparatus is further provided, which comprises: at least one HGA described above; at least one magnetic recording medium; and a recording circuit for controlling write operations which the thermally-assisted magnetic recording head performs to the magnetic recording medium, the recording circuit further comprising a light-emission control circuit for controlling operations of emitting the light. In the magnetic recording apparatus according to the present invention, a light source is preferably provided which supplies the light for thermal-assist to the end surface of the waveguide on the opposite side to the opposed-to-medium surface.

According to the present invention, a thermally-assisted magnetic recording method is further provided, which comprises steps of:

setting an intensity distribution of write magnetic field in such a way that an write field profile has a protruded portion on the trailing side, the write field profile being an intensity distribution of write magnetic field with respect to positions along a track in a recording layer of the magnetic recording medium, by using a thermally-assisted magnetic recording head including: a waveguide; and a write head element including: a main magnetic pole provided on the trailing side from said waveguide; and an auxiliary magnetic pole provided on the trailing side of the main magnetic pole, and irradiating a portion of the recording layer with a light for thermal-assist, the portion being positioned on a leading side from a center of the write field profile; thereby decreasing an anisotropic magnetic field of the portion in such a way that an anisotropic field profile traverses the protruded portion of the write field profile, the anisotropic field profile being a distribution of anisotropic magnetic field with respect to positions along a track in the recording layer.

In the thermally-assisted magnetic recording method, the anisotropic field profile traverses the protruded portion of the write field profile. Therefore, there can be formed stable record bits pattern having steep magnetization transition regions without depending on the irradiation of near-field light.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 6a shows a perspective view illustrating one embodiment of the waveguide;

FIG. 6b shows a plain view illustrating shapes of the ends of electromagnetic transducer and waveguide in the head part end surface;

FIG. 8 shows a schematic view for explaining an effective write field profile having a protruded portion on the trailing side according to the present invention;

DESCRIPTION OF THE PREFERRED EMBODIMENTS

Figure 1:
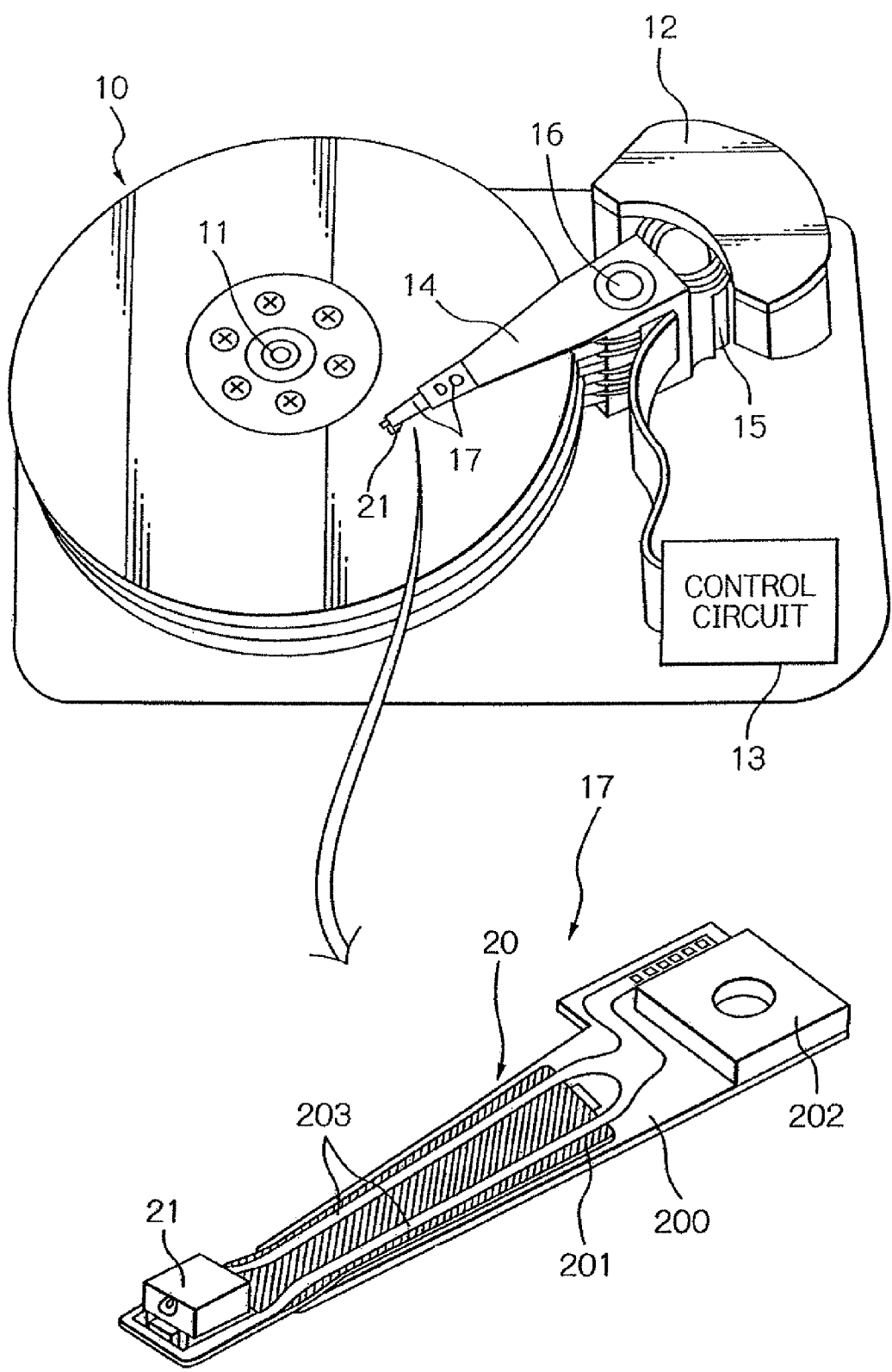
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and an HGA according to the present invention. Here, in the perspective view of the HGA, the side of the HGA opposed to the surface of the magnetic recording medium is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 thereon; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode as a light source that generates laser light for thermally-assisted magnetic recording, which will be described later.

In the present embodiment, the magnetic disk 10 is designed for perpendicular magnetic recording, and has a structure in which sequentially stacked on a disk substrate is: a soft-magnetic under layer; an intermediate layer; and a magnetic recording layer (perpendicular magnetization layer). The assembly carriage device 12 is a device for positioning the thermally-assisted magnetic recording head 21 above a track formed on the magnetic recording layer of the magnetic disk 10, on which record bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be single.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201 at the top end portion of the suspension 20 so as to face the surface of each magnetic disk 10 with a predetermined spacing (flying height). Moreover, one ends of the wiring member 203 are electrically connected to terminal electrodes of the thermally-assisted magnetic recording head 21.

The structure of the suspension 20 is not limited to the above-described one. An IC chip for driving the head may be mounted midway on the suspension 20, though not shown.

Figure 2:
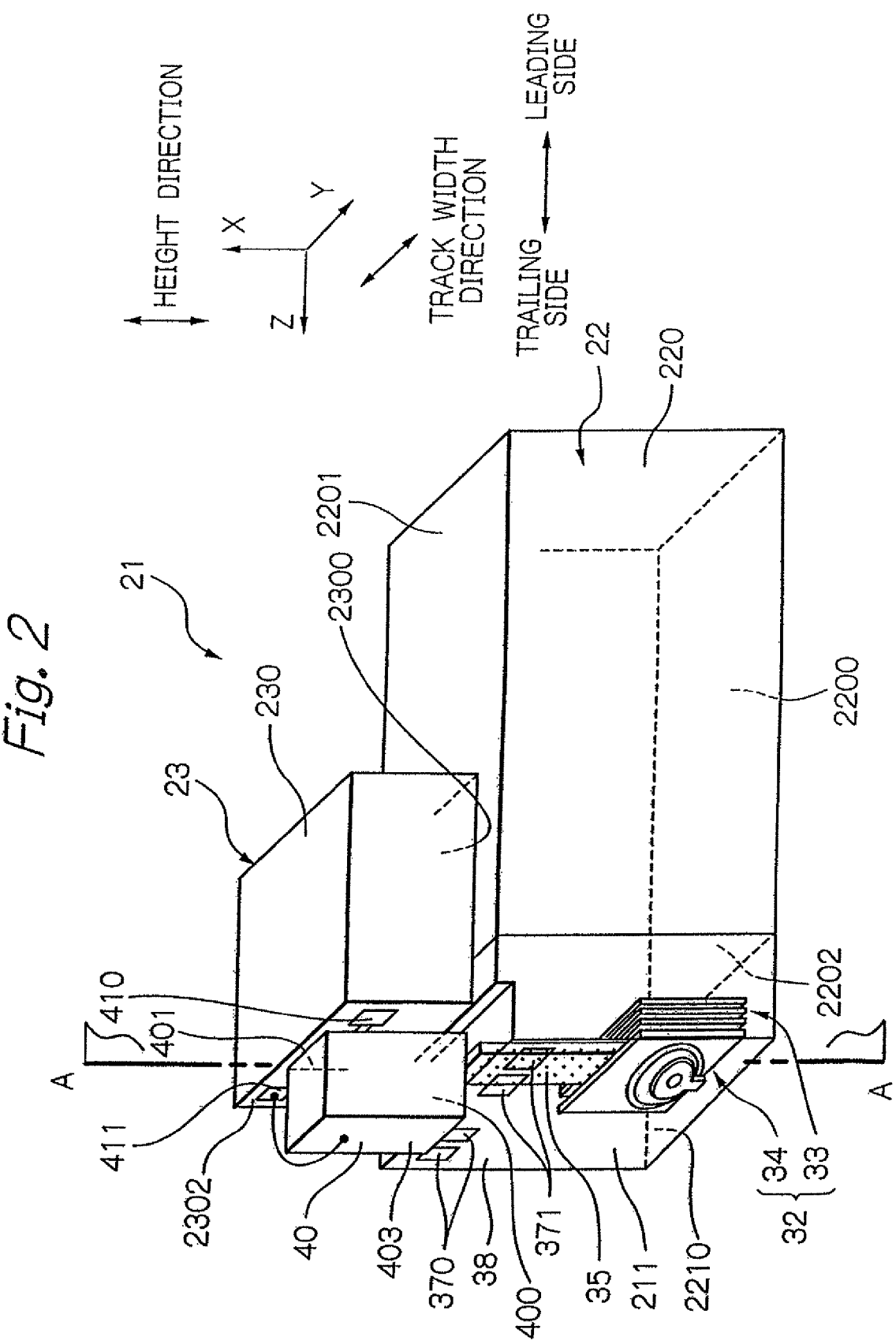
FIG. 2 shows a perspective view illustrating one embodiment of thermally-assisted magnetic recording head according to the present invention.

FIG. 2 shows a perspective view illustrating one embodiment of thermally-assisted magnetic recording head 21 according to the present invention.

As shown in FIG. 2, a thermally-assisted magnetic recording head 21 is constituted of the slider 22 and the light source unit 23. The slider 22 includes: a slider substrate 220 formed of, for example, AlTiC ($Al_2O_3$—TiC), and having an air bearing surface (ABS) 2200 processed so as to provide an appropriate flying height; and a head part 221 formed on an element-formation surface 2202 perpendicular to the ABS 2200. While, the light source unit 23 includes: a unit substrate 230 formed of, for example, AlTiC ($Al_2O_3$—TiC), and having an joining surface 2300; and a laser diode 40 as a light source provided on a source-installation surface 2302 perpendicular to the joining surface 2300. The slider 22 and the light source unit 23 are bonded to each other in such a way that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220.

In the slider 22, the head part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 for guiding laser light generated from the laser diode 40 provided in the light source unit 23 to the opposed-to-medium surface side; an overcoat layer 38 formed on the element-formation surface 2202, so as to cover the MR element 33, the electromagnetic transducer 34 and the waveguide 35; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34 and the waveguide 35 reach (extend to) the head part end surface 2210, which is an opposed-to-medium surface of the head part 221. The head part end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, a portion of the magnetic recording layer is irradiated to be heated with laser light propagating from the laser diode 40 of the light source unit 23 through the waveguide 35. As a result, the anisotropic magnetic field of the portion is decreased to a value that enables writing. Then, thermally-assisted magnetic recording is accomplished by applying write magnetic field (write field) to the portion with decreased anisotropic magnetic field of the magnetic recording layer.

In the instance, the waveguide 35 is provided between the MR element 33 and the electromagnetic transducer 34, that is, on the leading side (−Z side) of the electromagnetic transducer 34. By applying the special configuration of the electromagnetic transducer 34 and its vicinity including the arrangement of the waveguide 35, the head according to the present invention can realize favorable thermally-assisted magnetic recording suitable for higher recording density, without depending on the use of a near-field light generator for emitting near-field light. Alternatively, the thermally-assisted magnetic recording head 21 may have a configuration in which the laser diode 40 is directly mounted on the slider 22 instead of using the light source unit 23.

Figure 3:
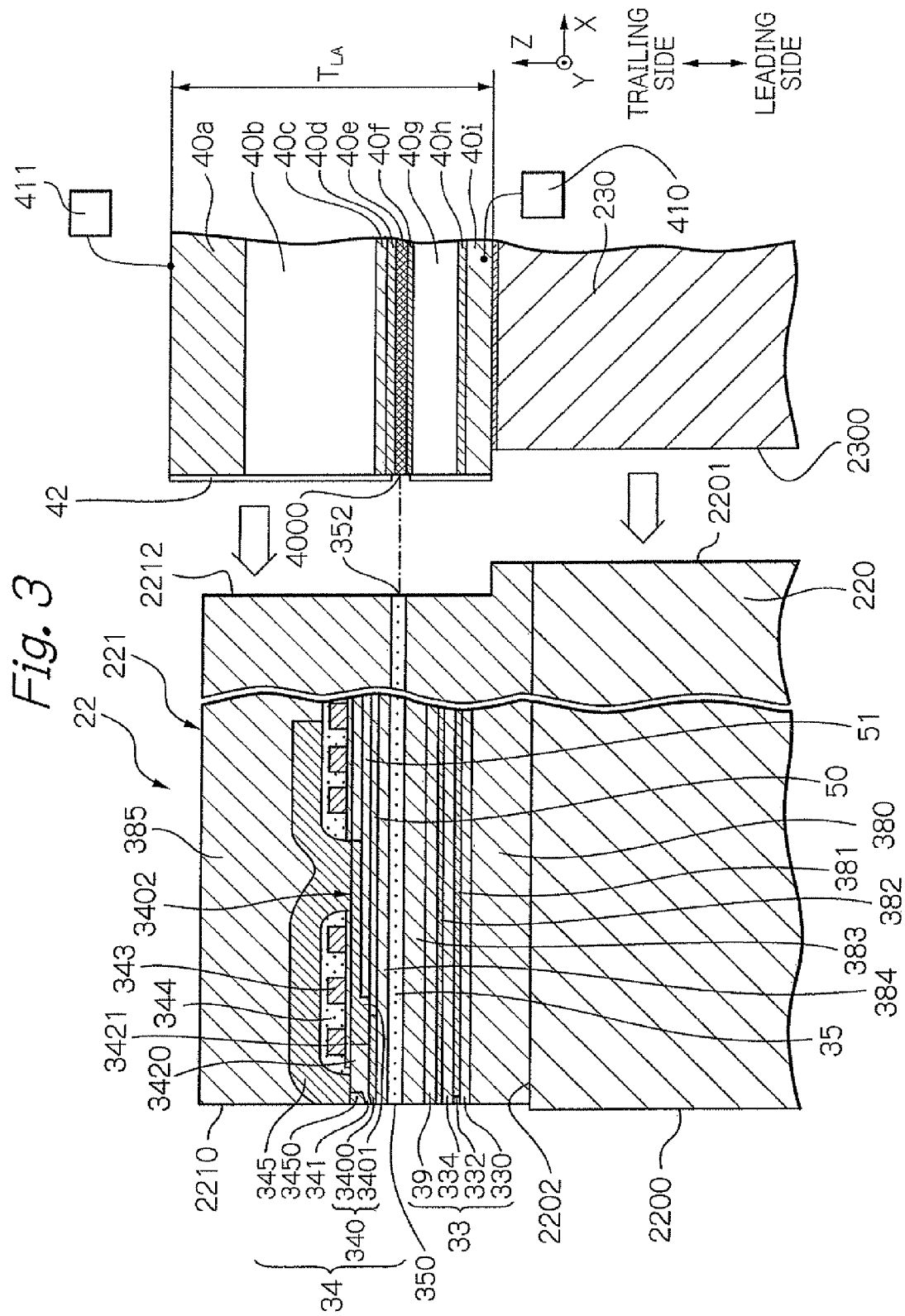
FIG. 3 shows a cross-sectional view taken by plane A in FIG. 2, schematically illustrating a main part of the thermally-assisted magnetic recording head.

FIG. 3 shows a cross-sectional view taken by plane A in FIG. 2, schematically illustrating a main part of the thermally-assisted magnetic recording head 21.

As shown in FIG. 3, the MR element 33 is formed on the insulating layer 380 stacked on the element-formation surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The upper and lower shield layers 334 and 330 are magnetic layers formed of a soft-magnetic material such as NiFe (Permalloy), FeSiAl (Sendust), CoFeNi, CoFe, FeN, FeZrN or CoZrTaCr, or the multilayer of at least two of these materials, with thickness of approximately 0.5 to 3 μm (micrometers), by using a frame plating method or a sputtering method.

The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes. Whereas, in the case that the MR multilayer 332 is a CIP-GMR multilayer, insulating layers are provided between the MR multilayer 332 and respective upper and lower shield layers 334 and 330; further, formed are MR lead layers that are electrically connected to the MR multilayer 332.

Also as shown in FIG. 3, the electromagnetic transducer 34 is designed for perpendicular magnetic recording in the present embodiment, and includes a main magnetic pole layer 340, a gap layer 341, a write coil layer 343, a coil insulating layer 344, and a write shield layer 345.

The main magnetic pole layer 340 acts as a magnetic path for converging and guiding a magnetic flux toward the magnetic recording layer (perpendicular magnetization layer) of the magnetic disk, the magnetic flux being excited by write current flowing through the write coil layer 343. The main magnetic pole layer 340 includes: a main pole tip 3400 as a first main pole; and a main pole body 3401 as a second main pole. One end of the main pole tip 3400 reaches the head part end surface 2210. The main pole body 3401 is provided on the end portion of the main pole tip 3400, the end portion being on the side opposite to the surface 2210. Thus, the main pole body 3401 is magnetically coupled with the main pole tip 3400. Both of the main pole tip 3400 and the main pole body 3401 are preferably formed of a soft-magnetic material, for example, of an iron alloy containing Fe as a main component, such as FeNi, FeCo, FeCoNi, FeN or FeZrN. Further, the main pole tip 3400 preferably has a saturation magnetic flux density equal to or higher than that of the main pole body 3401.

The gap layer 341 forms a gap for separating the main magnetic pole layer 340 from the write shield layer 345 in the region near the head part end surface 2210. The gap layer 341 is formed, for example, of a non-magnetic insulating material such as Al$_2$O$_3$ (alumina), SiO$_2$ (silicon dioxide), AlN (aluminum nitride) or DLC, or formed of a non-magnetic conductive material such as Ru (ruthenium). The thickness of the gap layer 341 determines the distance between the main magnetic pole layer 340 and the write shield layer 345, and is, for example, in the range of approximately 0.01 to 0.5 μm. The write coil layer 343 is formed on an insulating layer 3421 made of an insulating material such as Al$_2$O$_3$ (alumina), in such a way as to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is made of an insulating material such as a heat-cured photoresist and electrically isolates the write coil layer 343 from the main magnetic pole layer 340 and the write shield layer 345. The write coil layer 343 has a monolayer structure in the present embodiment, however, may have a two or more layered structure or a helical coil shape. Further, the number of turns of the write coil layer 343 is not limited to that shown in FIG. 3, and may be, for example, in the range from two to seven.

The write shield layer 345 as a auxiliary magnetic pole layer reaches the head part end surface 2210, and acts as a magnetic path for the magnetic flux returning from a soft-magnetic under layer that is provided under the magnetic recording layer (perpendicular magnetization layer) of the magnetic disk. The thickness of the write shield layer 345 is, for example, approximately 0.5 to 5 μm. Further, the write shield layer 345 has a trailing shield 3450 that is a portion opposed to the main magnetic pole layer 340. The trailing shield 3450 also extends to the head part end surface 2210, and acts for receiving the magnetic flux spreading from the main magnetic pole layer 340. In the present embodiment, the trailing shield 3450 is planarized together with the insulating layer 3420 and the main pole body 3401, and has a width in the track width direction larger than the width of the main pole body 3401 as well as than the main pole tip 3400. This trailing shield 3450 causes the magnetic-field gradient between the end portion of the trailing shield 3450 and the main pole tip 3400 to become steeper. As a result, the jitter of signal output becomes smaller; therefore, error rates during read operation can be reduced. The write shield layer 345 is formed of a soft-magnetic material. Especially, the trailing shield 3450 is formed of a material with high saturation magnetic flux density such as NiFe (Permalloy) or is formed of such an iron alloy as the main pole tip 3400 is formed of.

Referring to FIG. 3, the waveguide 35 is located between the MR element 33 and the electromagnetic transducer 34, and is formed on an insulating layer 383 that plays a role of a clad for the laser light propagating through the waveguide 35. Further, the waveguide 35 is placed in parallel with the element-formation surface 2202, and extends, from an rear-end surface 352 that reaches the head part end surface 2211 opposite to the ABS 2200, to an end surface 350 that reaches the head part end surface 2210. A detailed explanation about the configuration and structures of the waveguide 35, the main pole tip 3400 and main pole body 3401 according to the present invention will be given later with reference to FIG. 4a.

Further, as is in the present embodiment, an inter-element shield layer 39 is preferably provided between the MR element 33 and the electromagnetic transducer 34 (waveguide 35), sandwiched between the insulating layers 382 and 383. The inter-element shield layer 39 may be formed of a soft-magnetic material, and plays a role for shielding the MR element 33 from the magnetic field generated from the electromagnetic transducer 34. Further, a backing coil portion may be provided between the inter-element shield layer 39 and the waveguide 35, though not shown in the figure. The backing coil portion is a coil portion for generating magnetic flux to negate a magnetic flux loop that is generated from the electromagnetic transducer 34 and passes through the upper and lower shield layers 334 and 330 of the MR element 33. Thus, the backing coil portion intends to suppress wide adjacent track erasure (WATE), that is, unwanted writing or erasing to the magnetic disk.

Also according to FIG. 3, the light source unit 23 includes: a unit substrate 230; a laser diode 40 provided on the source-installation surface 2302 of the unit substrate 230; a terminal electrode 410 electrically connected to a p-electrode 40i of the laser diode 40; and a terminal electrode 411 electrically connected to an n-electrode of the laser diode 40. The terminal electrodes 410 and 411 are electrically connected to the connection pads of the wiring member 203 provided on the flexure 201 (FIG. 1). By applying a predetermined voltage between the electrodes 410 and 411 of the laser diode 40, laser light is emitted from the emission center 4000 on an emission surface 400 of the laser diode 40.

A light source such as InP base, GaAs base or GaN base diode can be utilized as the laser diode 40, which is usually used for communication, optical disk storage or material analysis. Here, the thermally-assisted magnetic recording head 21 according to the present invention heats a magnetic recording medium without depending on the use of a near-field light generator. Therefore, there is no restriction on usable wavelength of the laser light which depends on the kind of constituent material of the near-field light generator. This extends the range of the choices for wavelength $\lambda_L$ of the emitted laser light. Actually, the wavelength $\lambda_L$ may be, for example, in the range of approximately 375 nm (nanometers) to 1.7 µm. Specifically, for example, a laser diode of InGaAsP/InP quaternary mixed crystal can also be used, in which possible wavelength region is set to be from 1.2 to 1.67 µm.

In the present embodiment, the laser diode 40 has a multi-layered structure including an n-electrode 40a, an n-GaAs substrate 40b, an n-InGaAlP clad layer 40c, the first InGaAlP guide layer 40d, an active layer 40e formed of multiquantum well (InGaP/InGaAlP) or the like, the second InGaAlP guide layer 40f, an p-InGaAlP clad layer 40g, p-electrode base layer 40h, and p-electrode 40i. On the front and rear cleaved surfaces of the multilayered structure, respectively formed are reflective layers for exciting the oscillation by total reflection. The reflective layer 42 has an opening in the position of the active layer 40e including the light-emission center 4000. Here, the laser diode 40 may have a thickness $T_{LA}$ of, for example, approximately 60 to 200 µm.

Further, an electric source provided within the magnetic disk apparatus can be used for driving the laser diode 40. In fact, the magnetic disk apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk apparatus. The laser diode 40 and terminal electrodes 410 and 411 are not limited to the above-described embodiment. For example, the n-electrode 40a may be fixed to the source-installation surface 2302 of the unit substrate 230 by turning the electrodes of the laser diode 40 upside down. Further, alternatively, the thermally-assisted magnetic recording head 21 may include no laser diode 40; then, the light-emission center of a laser diode provided within the magnetic disk apparatus and the rear-end surface 352 of the waveguide 35 may be connected by using, for example, optical fiber.

Each of the slider 22 and light source unit 23 may have an arbitrary size. For example, the slider 22 may be so-called a femto slider in which the width in the track width direction (Y-axis direction) is 700 µm; the length (in Z-axis direction) is 850 µm; and the thickness (in X-axis direction) is 230 µm. In the case, the light source unit 23 may be one size smaller than the slider 22, for example, in which the width in the track width direction is 425 µm; the length is 300 µm; and the thickness is 300 µm.

By joining the above-described light source unit 23 and slider 22, constituted is the thermally-assisted magnetic recording head 21. In the joining, the joining surface 2300 of the unit substrate 230 is made to have a surface contact with the back surface 2201 of the slider substrate 220. Then, the locations of the unit substrate 230 and the slider substrate 220 are determined in such a way that the laser light generated from the laser diode 40 can directly enter the waveguide 35 through the rear-end surface 352 opposite to the ABS 2200 of the waveguide 35.

Figure 4A:
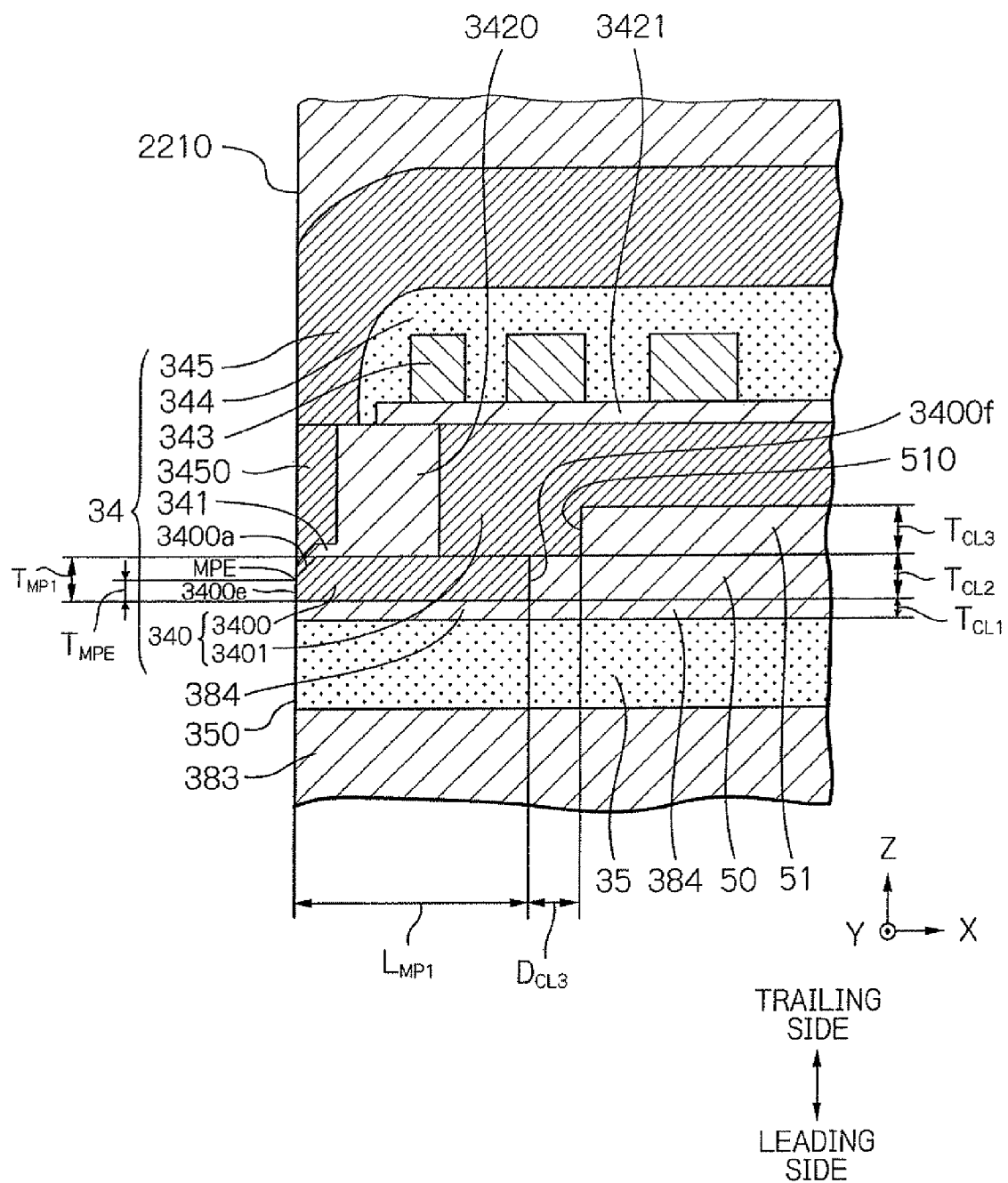
FIG. 4a shows a cross-sectional view taken by plane A in FIG. 2, schematically illustrating a main part of the waveguide and the electromagnetic transducer in the thermally-assisted magnetic recording head.
Figure 4B:
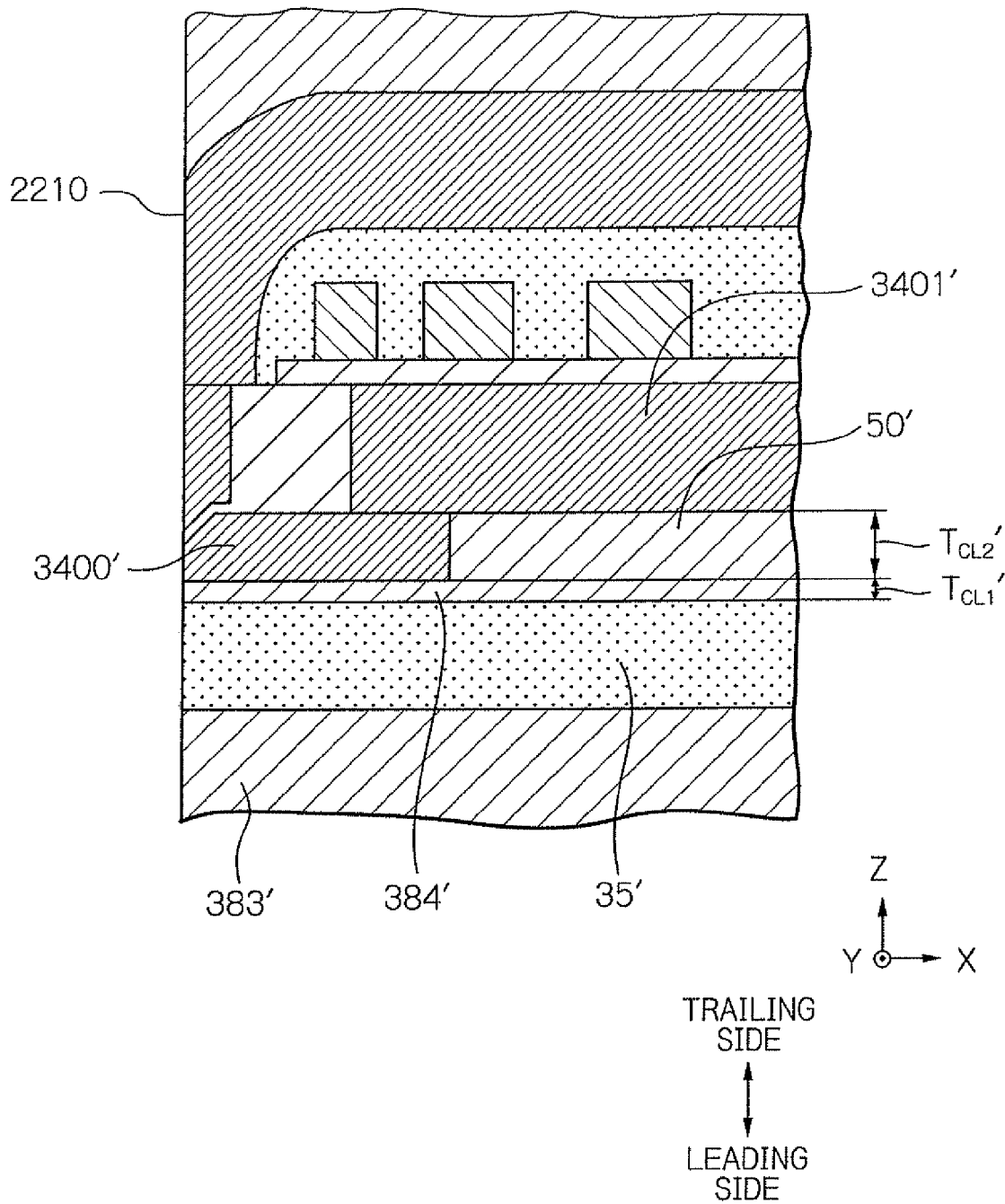
FIG. 4b shows a cross-sectional view taken by plane A in FIG. 2, schematically illustrating a main part of another embodiment regarding the waveguide, the main magnetic pole layer and their vicinity.
Figure 5:
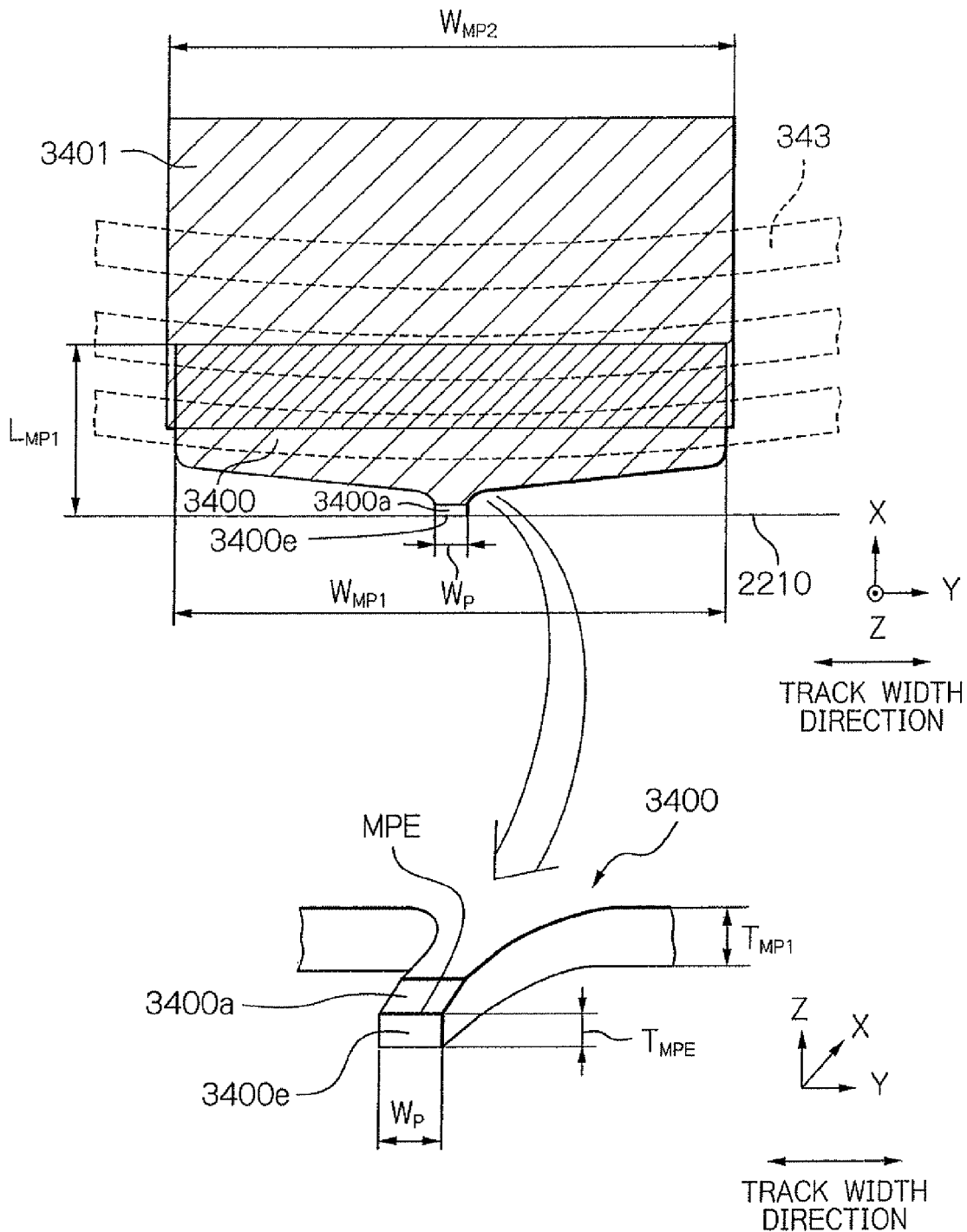
FIG. 5 shows a top view and a perspective view schematically illustrating the structure of the main magnetic pole layer.

FIG. 4a shows a cross-sectional view taken by plane A in FIG. 2, schematically illustrating a main part of the waveguide 35 and the electromagnetic transducer 34 in the thermally-assisted magnetic recording head 21. And FIG. 4b shows a cross-sectional view taken by plane A in FIG. 2, schematically illustrating a main part of another embodiment regarding the waveguide 35, the main magnetic pole layer 340 and their vicinity. Further, FIG. 5 shows a top view and a perspective view schematically illustrating the structure of the main magnetic pole layer 340.

As shown in FIG. 4a, the main magnetic pole layer 340 is provided on the trailing side (+Z side) from the waveguide 35, for applying write field to the magnetic recording layer of the magnetic disk. The write shield layer 345 is provided on the trailing side from the main magnetic pole layer 340. As described above, the main magnetic pole layer 340 includes: a main pole tip 3400 as a first main pole reaching the head part end surface 2210; and a main pole body 3401 as a second main pole provided on the end portion of the main pole tip 3400, the end portion being on the opposite side to the head part end surface 2210.

Further, in the thermally-assisted magnetic recording head 21, the waveguide 35 and the main pole tip 3400 are opposed to each other through a first clad layer 384 that acts as a clad for the laser light propagating through the waveguide 35. Moreover, a second clad layer 50, which also acts as a clad, is provided on the first clad layer 384, and on the rear side from the main pole tip 3400 when viewed from the head part end surface 2210 side. Under this configuration, the end surface 350 of the waveguide 35 reaching the surface 2210 can be placed much close to the end surface 3400 of the main pole tip 3400 reaching the surface 2210, apart by only a distance $T_{CL1}$ (thickness of the first clad layer 384). As a result, during writing record bits, the end surface 3400e of the tip 3400 can apply a sufficient intensity of write field to the intensity center and its vicinity of the light spot formed on the magnetic recording layer of the magnetic disk, which is irradiated with laser light emitted from the end surface 350 of the waveguide 35. Accordingly, there can be formed stable record bits pattern having steep magnetization transition regions.

Further, the range of the region where the waveguide 35 and the main pole tip 3400 are opposed to each other is limited to the length $L_{MP1}$ of the main pole tip 3400 in the direction perpendicular to the head part end surface 2210. And the other portion of the waveguide 35, which is not opposed to the tip 3400, extends along with a clad having sufficient thickness, the clad including at least the first clad layer 384 and the second clad layer 50. Therefore, the clad fulfills its function; thus, there can be suppressed the increase of propagation loss of laser light propagating through the waveguide 35. Further, the absorption of the laser light by the main magnetic pole layer 340 can also be suppressed. Here, the thickness $T_{CL2}$ of the second clad layer 50 can be set to be equal to the thickness $T_{MP1}$ of the main pole tip 3400, and is preferably 0.05 µm or more, and preferably 0.25 µm or less.

The length $L_{MP1}$ of the main pole tip 3400 is preferably 3 µm or more. This is because: the main pole tip 3400 needs to have a substantial length of at least 2 µm in order to generate a sufficient intensity of write field, and additionally, the coupling region between the main pole tip 3400 and the main pole body 3401 needs to have a length of at least 1 µm in order to obtain sufficient magnetic coupling. Further, the length $L_{MP1}$ is preferably 4 µm or less. This is because: by setting $L_{MP1}$ to be 4 µm or less, the region where the waveguide 35 are opposed to the main pole tip 3400 becomes smaller, the region having a clad with less adequate thickness; thus, there can be sufficiently suppressed the absorption of the laser light propagating through the waveguide 35 by the main pole tip 3400. That is, by shortening the length (pole height) $L_{MP1}$ of the main pole tip 3400 and providing the second clad layer 50 on the rear side (+X side) from the main pole tip 3400, the absorption of laser light by the main magnetic pole layer 340 can be kept to a minimum.

Further, as explained in detail later, the thickness $T_{CL1}$ of the first clad layer 384 is preferably in the range from 10 nm and 100 nm, and may be set, for example, to be 50 nm. This setting of the thickness $T_{CL1}$ enables the first clad layer 384 to function as a clad and provides a sufficiently small distance between the waveguide 35 and the main pole tip 3400.

Furthermore, in the present embodiment, as shown in FIG. 4a, a third clad layer 51 acting as a clad for the laser light propagating through the waveguide 35 is provided between the second clad layer 50 and the main pole body 3401. By adding the third clad layer 51, the laser light propagating through the waveguide 35 can receive a more sufficient clad function, and there can be suppressed the increase in propagation loss of the laser light more surely. Further, there can be sufficiently suppressed the absorption of the laser light propagating through the waveguide 35 by the main pole body 3401. To keep the more sufficient clad function, the third clad layer preferably has a thickness $T_{CL3}$ of at least 0.4 µm.

In the waveguide structure of the present embodiment, the waveguide 35 corresponds to a core, and the first clad layer 384, the second clad layer 50 and the third clad layer 51 to a clad. Here, it is preferable that the total thickness $T_{CL1}+T_{CL2}+T_{CL3}$ of the first to third clad layers 384, 50 and 51 is at least comparable with the wavelength $\lambda_L$ of laser light to be used. In the case, almost all portions of the waveguide 35 can secure a clad with sufficient thickness.

Further, the end 510 of the third clad layer 51 on the head part end surface 2210 side is preferably recessed by a distance $D_{CL3}$ from the end 3400f of the main pole tip 3400 when viewed from the head end surface 2210 side, the end 3400f being on the opposite side to the end surface 2210. This setting of the distance $D_{CL3}$ can secure a joint area needed for obtaining adequate magnetic coupling between the main pole tip 3400 and the main pole body 3401 during head manufacturing process. That is, there can be avoided a situation in which the formation of the third clad layer 51 limits the magnetic coupling. As a result, a sufficient intensity of write field can be generated from the main pole tip 3400. It is known that the distance $D_{CL3}$ is preferably in the range from 1 µm to 2 µm.

Alternatively, as shown in FIG. 4b, it is possible that the second clad layer 50' and the main pole body 3401' have a surface contact with each other directly; thus, an additional clad layer is not provided therebetween. In the case, it is preferable that the total thickness $T_{CL1}'+T_{CL2}'$ of the first and second clad layers 384' and 50' is at least comparable with the wavelength $\lambda_L$ of laser light to be used, which is needed for sufficient clad function.

According to FIG. 5, the width $W_{MP2}$ in the track width direction (Y-axis direction) of the main pole body 3401 is the same as or more than the width $W_{MP1}$ in the track width direction of the main pole tip 3400. And a portion of the main pole tip 3400 on the head part end surface 2210 side is tapered in the track width direction (Y-axis direction); thus, the width $W_P$ of the portion on the end surface 2210 becomes drastically smaller compared to the width $W_{MP1}$. The significantly small width $W_P$ on the end surface 2210 of the main pole tip 3400 enables minute write field to be generated, and can make the track width have a very small value corresponding to high recording density. The width $W_P$ is, for example, in the range of approximately 0.05 to 0.5 µm.

Further, as shown in FIGS. 4a and 5, in the present embodiment, the end portion of the main pole tip 3400 on the head end surface 2210 side is tapered in the stacking direction (Z-axis direction), in such a way that an inclined surface 3400a reaching the end surface 2210 is provided on the trailing side (+Z side) of the end portion. Here, at the trailing edge MPE and its vicinity of the end surface 3400e of the main pole tip 3400, the magnetic-field gradient of write field is sufficiently large under the configuration of the thermally-assisted magnetic recording head 21, as described in detail later. Thus, the trailing edge MPE is exactly a position for writing data. The trailing edge MPE is also an edge of the inclined surface 3400a; thus, is positioned more on the leading side (-Z side) than it would be in the case without the inclined surface 3400a. As a result, by applying the above-described tapered structure having the inclined surface 3400a, the trailing edge as a writing position can be provided closer to the end surface 350 of the waveguide 35 under the condition that the main pole tip 3400 keeps a sufficient volume needed as a magnetic path. Therefore, during writing record bits, a sufficient intensity of write field can be applied from the trailing edge MPE of the main pole tip 3400 to the spot center and its vicinity of laser light with which the magnetic recoding layer of the magnetic disk is irradiated, the laser light being emitted from the end surface 350 of the waveguide 35.

The main pole tip 3400 can be narrowed down to, for example, a half thickness, by setting the thickness $T_{MP1}$ of the tip 3400 to be, for example, 0.2 µm and further setting the thickness $T_{MPE}$ at the end surface 3400e to be, for example, 0.1 µm, the end surface 3400e being an end toward which the tip 3400 tapers with the inclined surface 3400a. Further, to bring the trailing edge MPE closer to the end surface 350 of the waveguide 35, $T_{MPE}/T_{MP1}$ may be set to be 0.5 or less. It is also preferable that, as the present embodiment, the end surface of the trailing shield 3450 is inclined along with the inclined surface 3400a, and the main pole tip 3400 and the trailing shield 3450 are opposed to each other through a predetermined narrow gap. This configuration causes the magnetic-field gradient of write field near the trailing edge MPE to become steeper.

FIG. 6a shows a perspective view illustrating one embodiment of the waveguide 35, and FIG. 6b shows a plain view illustrating shapes of the ends of electromagnetic transducer 34 and waveguide 35 in the head part end surface 2210.

The waveguide 35 may have a rectangular parallelepiped shape extended in X-axis direction; or, as shown in FIG. 6a, may have a portion that tapers in the track width direction (in Y-axis direction) on the head part end surface 2210 side. The width $W_{WG1}$ in the track width direction (in Y-axis direction) near the rear end surface 352 of the waveguide 35 may be, for example, in the range approximately from 1 to 200 µm, and the width $W_{WG2}$ in the track width direction (in Y-axis direction) near the end surface 350 of the waveguide 35 may be, for example, in the range approximately from 0.3 to 1 µm. The thickness $T_{WG}$ (in Z-axis direction) may be, for example, in the range approximately from 0.1 to 4 µm, and the height $H_{WG}$ (in X-axis direction) may be, for example, in the range approximately from 10 to 300 µm.

Further, as shown in FIGS. 6a and 6b, both side surfaces 351 and a lower surface 353 has a surface contact with the insulating layer 383 as a clad. And an upper surface 354 of the waveguide 35 has a surface contact with the first clad layer 384. The waveguide 35 is formed, for example, by using a sputtering method, of a dielectric material with higher refractive index n than refractive indexes of the constituent materials of the insulating layer 383, the first clad layer 384, and further the second and third clad layers 50 and 51 (FIG. 4a). For example, in the case that the insulating layer 383 and the first to third clad layers 384, 50 and 51 are formed of $SiO_2$ (n=1.5), the waveguide 35 can be formed of, for example, $Al_2O_3$ (n=1.63). Further, in the case that the insulating layer 383 and the first to third clad layers 384, 50 and 51 are formed of $Al_2O_3$ (n=1.63), the waveguide 35 can be formed of, for example, $SiO_xN_Y$ (n=1.7-1.85), $Ta_2O_5$ (n=2.16), $Nb_2O_5$ (n=2.33), TiO (n=2.3-2.55) or $TiO_2$ (n=2.3-2.55). By forming the waveguide 35 of the above-described material, it is possible to reduce the propagation loss of laser light due to excellent optical characteristics of the material. Further, the waveguide 35 acts as a core, while the insulating layer 383 and the first to third clad layers 384, 50 and 51 function as a clad; thus the total reflection condition is satisfied at side surfaces 351, the lower surface 353 and the upper surface 354. As a result, more amount of laser light 48 can reach the end surface 350, which improves the propagation efficiency of the waveguide 35.

Moreover, as shown in FIG. 6b, the end surface 350 of the waveguide 35 is placed on the leading side (−Z side) from the end surface 3400e of the main pole tip 3400 of the electromagnetic transducer 34 in the head part end surface 2210. Here a distance in Z-axis direction between a spot center 3500 on the end surface 350 of the laser light emitting from the end surface 350 and the trailing edge MPE of the end surface 3400e of the main pole tip 3400 is defined as $D_{MWE}$. For thermally-assisted magnetic recording of the present invention, it is significantly important to control the positional relation between the distribution of write magnetic field and the distribution of anisotropic magnetic field in the magnetic recording layer of the magnetic disk, by setting $D_{MWE}$ to be a sufficient small value, as described in detail later. The distance $D_{MWE}$ is expressed as:

$$D_{MWE} = T_{MPE} + T_{CL1} + D_{CENT} \quad (1)$$

where $D_{CENT}$ is a distance between the spot center 3500 and the upper surface 354 of the waveguide 35. In this expression, the thickness $T_{MPE}$ can be made sufficiently small by applying the tapered structure having the inclined surface 3400a in the main pole tip 3400 as shown in FIGS. 4a and 5. Further, the thickness $T_{CL1}$ of the first clad layer can be made sufficiently small by making the length $L_{MP1}$ of main pole tip 3400 sufficiently small and by providing the second clad layer on the rear side (+X side) from the main pole tip 3400. As described above, the distance $D_{MWE}$ can be controlled to be a sufficiently small value. Moreover, further reduction in the distance $D_{MWE}$ value can be achieved by controlling the distance $D_{CENT}$ between the spot center 3500 and the upper surface 354 of the waveguide 35.

The control of the distance $D_{CENT}$ becomes possible by applying a multilayered structure of dielectric materials to the waveguide 35, in which, the upper a layer is, the higher refractive index n the layer has. The multilayered structure can be realized, for example, by sequentially stacking dielectric materials of $SiO_xN_Y$ with changing the composition ratio X and Y appropriately. The number of stacked layers may be, for example, in the range from 8 to 12. In the case that laser light 48 is linearly polarized in Z-axis direction, the above-described multilayered structure enables the spot center 3500 of the laser light 48 in the end surface 350 to be positioned closer to the electromagnetic transducer 34 (trailing edge MPE) in Z-axis direction. It is possible to realize a required value of distance $D_{MWE}$ by selecting the number of layers and the thickness and composition of each layer of the multilayered structure.

As shown in FIG. 6b, the end surface 3400e of the main pole tip 3400 has a rectangular (square) shape; alternatively, may have a trapezoidal shape. The above-described width $W_P$ in the track width direction (Y-axis direction) of the end surface 3400 is equivalent to the length of the trailing edge MPE to write data, and determines the width of a track formed on the magnetic recording layer of the magnetic disk. The width $W_P$ is, for example, in the range of approximately 0.05 to 0.5 µm.

Hereinafter, there will be explained, with reference to comparative examples, the thermally-assisted magnetic recording according to the present invention, which is implemented by using light emitted from the waveguide 35 and without depending on the use of a near-field light generator.

Figure 7A:
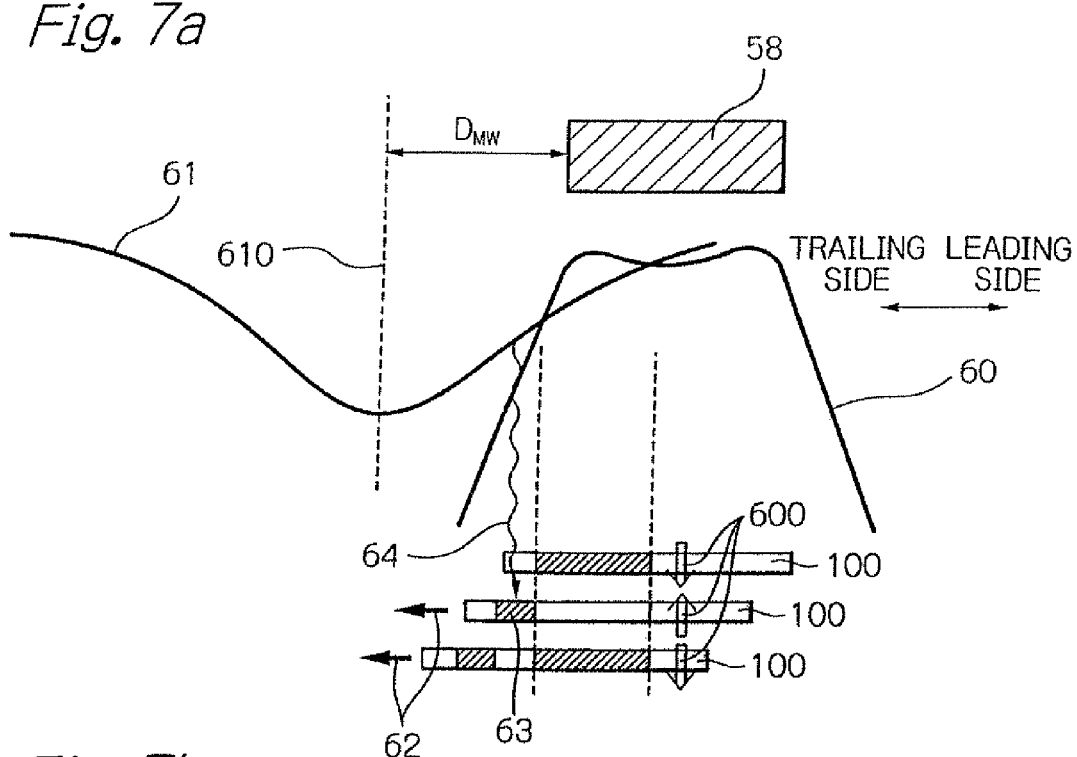
FIGS. 7a and 7b show schematic views illustrating effective write field profiles and anisotropic field profiles in comparative examples, in which thermally-assisted magnetic recording is implemented by using a supplier of laser light with a large spot diameter, such a waveguide.
Figure 7B:
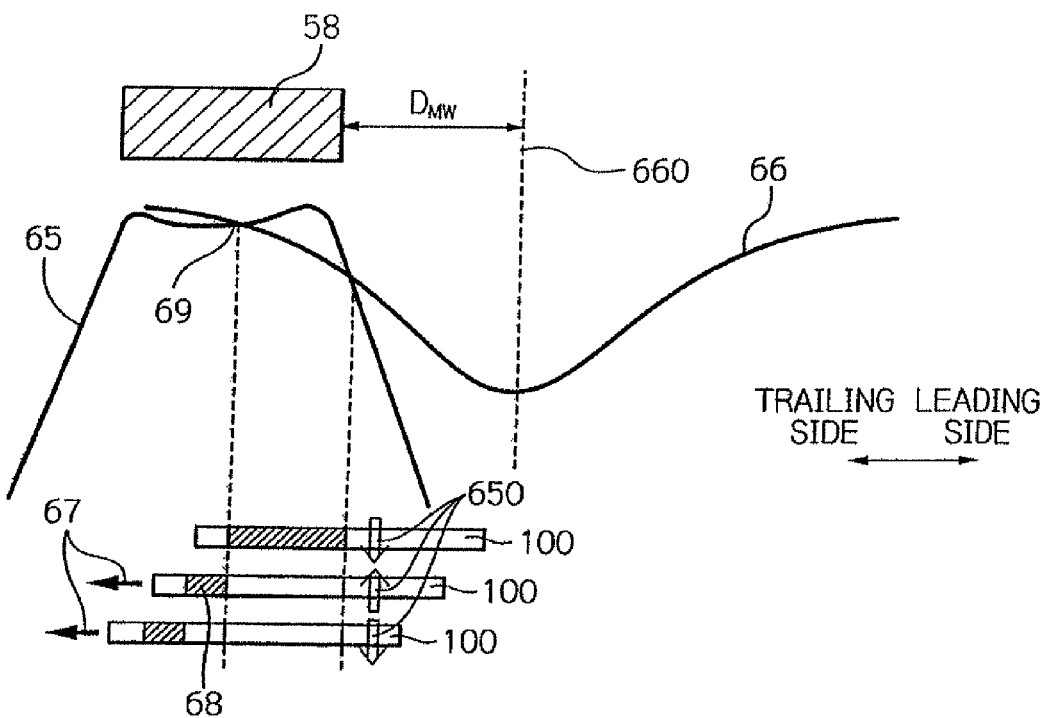

FIGS. 7a and 7b show schematic views illustrating effective write field profiles and anisotropic field profiles in comparative examples, in which thermally-assisted magnetic recording is implemented by using a supplier of laser light with a large spot diameter, such as a waveguide. FIG. 7a corresponds to the case that a supplier of laser light is positioned on the trailing side from the main magnetic pole 58 of the head, and FIG. 7b corresponds to the case that a supplier of laser light is positioned on the leading side from the main magnetic pole 58 of the head.

Here, an effective write field profile is defined as the intensity distribution of effective write field with respect to positions along a track in the magnetic recording layer of the magnetic disk. Then, effective write field is a write magnetic field generated from the main magnetic pole, which acts effectively on the magnetic recording layer to write record bits by reversing the magnetization of the layer. Further, an anisotropic field profile is defined as the distribution of anisotropic magnetic field with respect to positions along a track in the magnetic recording layer when a portion of the magnetic recording layer is irradiated with laser light for thermal assist, and anisotropic magnetic field of the portion is decreased. The effective write field profiles and anisotropic field profiles shown in FIGS. 7a and 7b are simplistically illustrated; especially, the effective write field profiles will be explained in detail later with reference to FIG. 8.

First, as shown in FIG. 7a, there is explained the case that the supplier of laser light is provided on the trailing side from the main magnetic pole 58 of the head. In this case, an anisotropic field profile 61 has a shape of wider valley than an anisotropic field profile of the case of using a near-field light generator. An effective write field profile 60 and the anisotropic field profile 61 are arranged in such a way that two profiles cross at two cross points, where one point is positioned on the field gradient region on the trailing side of the profile 60, and another point is positioned on the flat region of the profile 60. Thus, a distance $D_{MW}$ between the end surface on the trailing side of the main magnetic pole 58 and an irradiation center 610 of the supplier of laser light is not required to be much smaller, compared to the distance in the case of using a near-field light generator. Under this arrangement, the magnetization of the magnetic recording layer 100 of the magnetic disk can be reversed in the region where the anisotropic field profile 61 underruns the effective write field profile 60 (anisotropic magnetic field $H_K$<effective write field $H_{EFF}$). A record bit 63 is formed on the magnetic recording layer 100 by reversing the direction 600 of write field, while the magnetic recording layer 100 is moving to the direction indicated by arrow 62 due to the magnetic disk rotation.

However in this case, the record bit 63, which has been once determined, comes close to the irradiation center 610 of the supplier of laser light after being written, and suffers a higher temperature 64. As a result, the magnetization transition region of the record bit 63 is disturbed; thus the record bit 63 may be damaged.

As shown in FIG. 7b, in the case that the supplier of laser light is disposed on the leading side of the main magnetic pole 58 of the head, an effective write field profile 65 and an anisotropic field profile 66 are arranged in such a way that two profiles cross at two cross points, where one point 69 is positioned on the flat region of the profile 65, and another point is positioned on the field gradient region on the leading side of the profile 65. In this case, the magnetization transition region of the record bit 68 is eventually decided at the cross point 69 where the field gradients of both profiles 65 and 66 are very small. Here the very small field gradient of the anisotropic field profile 66 means that the gradient of temperature is very small. As a result, the magnetization transition of record bit 68 is decided under the condition that gradients of both magnetic field and temperature are very small; thus, it becomes significantly difficult to achieve high linear recording density.

As described above, it is difficult to achieve a thermally-assisted magnetic recording which can respond to the requirement for high linear recording density, by just using a conventional supplier of light with a large spot diameter. Hereinafter, there will be explained the thermally-assisted magnetic recording according to the present invention.

FIG. 8 shows a schematic view for explaining an effective write field profile having a protruded portion on the trailing side according to the present invention.

As shown in FIG. 8, a write magnetic field, which is generated from the main pole tip 3400 of the electromagnetic transducer 34, has components $H_P$, $H_T$ and $H_L$. The write field component $H_P$ is a component in the direction perpendicular to the surface of the magnetic recording layer (in X-axis direction). The write field component $H_T$ is a component in the direction along the track in the surface of the magnetic recording layer (in Z-axis direction). Further, the write field component $H_L$ is a component in the track width direction in the surface of the magnetic recording layer (in Y-axis direction). Each of these write field components $H_P$, $H_T$ and $H_L$ has a value at the center position in the stacking direction (in X-axis direction) of the magnetic recording layer (perpendicular magnetization layer) 100 within the layer 100. Further, as shown in FIG. 4a, the electromagnetic transducer 34 has a main pole tip 3400 and a trailing shield 3450 that is opposed to the end portion on the head part end surface 2210 side of the main pole tip 3400 through a very narrow gap.

The write field components $H_P$, $H_T$ and $H_L$ can be expressed by profiles 70, 71 and 72, where the transverse axis shows position L in the direction along the track (in Z-axis direction). As easily understood by the profile 72, the write field component $H_L$ is usually very small compared to the other write field components $H_P$ and $H_T$. Here, the effective write field $H_{EFF}$, which works on the magnetic recording layer effectively to form record bits by reversing the magnetization of the magnetic recording layer, is expressed in the form depending on three write field components $H_P$, $H_T$ and $H_L$ as follows:

$$H_{EFF}=((H_P^2+H_T^2)^{1/3}+H_L^{2/3})^{3/2} \quad (2)$$

This is because: the write field components $H_T$ and $H_L$ in respective Z-axis and Y-axis directions also contribute to the reversal of magnetization by inducing the precession movement of the magnetization, while it is obvious that the write magnetic field component $H_P$ in −X direction contributes to the reversal of the magnetization of the magnetic recording layer 100 in the case of changing the direction of the magnetization, for example, from upside (+X direction) to downside (−X direction). Therefore, the effective write field $H_{EFF}$ can be expressed by a profile 73, where the transverse axis also shows position L. Here, because the end portion on the head part end surface 2210 side of the main pole tip 3400 is opposed to the trailing shield 3450 through a very narrow gap, the effective write field profile 73 is made to have a protruded portion 730 on the trailing side (+Z direction) due to the write field components $H_T$ and $H_L$. From a qualitative standpoint, it can be understood the protruded portion 730 is caused by the tendency that generated write field concentrate on the edge portion of the main pole tip 3400 on the trailing shield 3450 side.

The height and width of the protruded portion 730 can be controlled by adjusting the size and shape of the main pole tip 3400 and the trailing shield 3450 of the electromagnetic transducer 34, and the distance between them. Especially, an experimental result shows that it is possible to set the maximum value of the effective write field at the protruded portion 730 to be a sufficiently large value exceeding 25 kOe (kiloersteds), by adjusting the thickness $T_{MPE}$ (FIGS. 4a and 5) of the end portion of the main pole tip 3400, the end portion having a high saturation magnetic flex density.

According to the present invention, thermally-assisted magnetic recording is performed by using the effective write field profile that is adjusted to have a protruded portion with a sufficiently large height on the trailing side (+Z side).

Figure 9A:
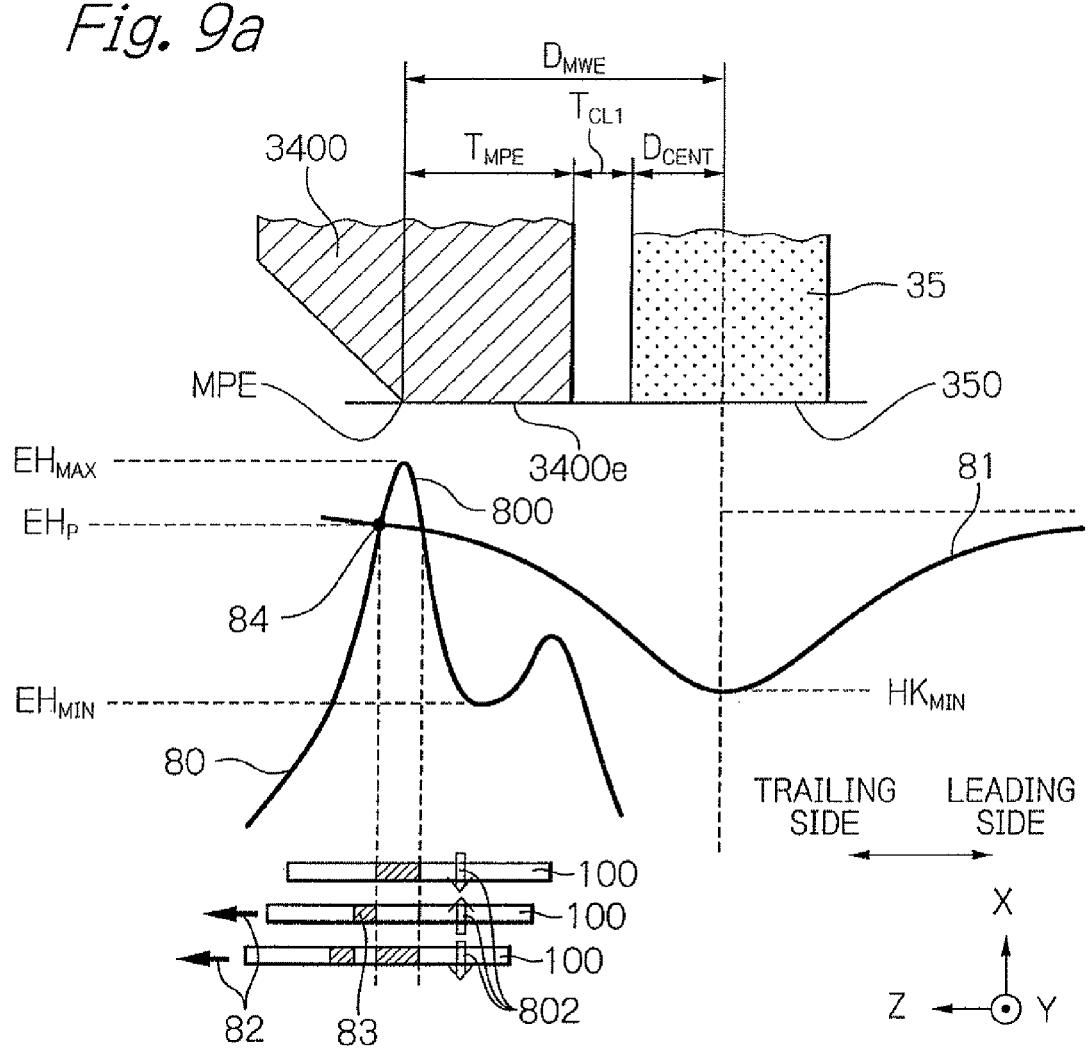
FIGS. 9a and 9b show schematic views illustrating effective write field profiles and anisotropic field profiles, for explaining the principle of the thermally-assisted magnetic recording according to the present invention.
Figure 9B:
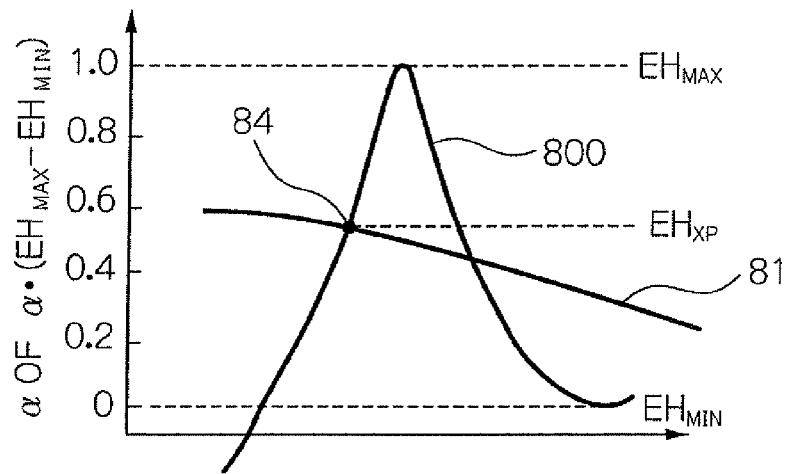
Figure 10:
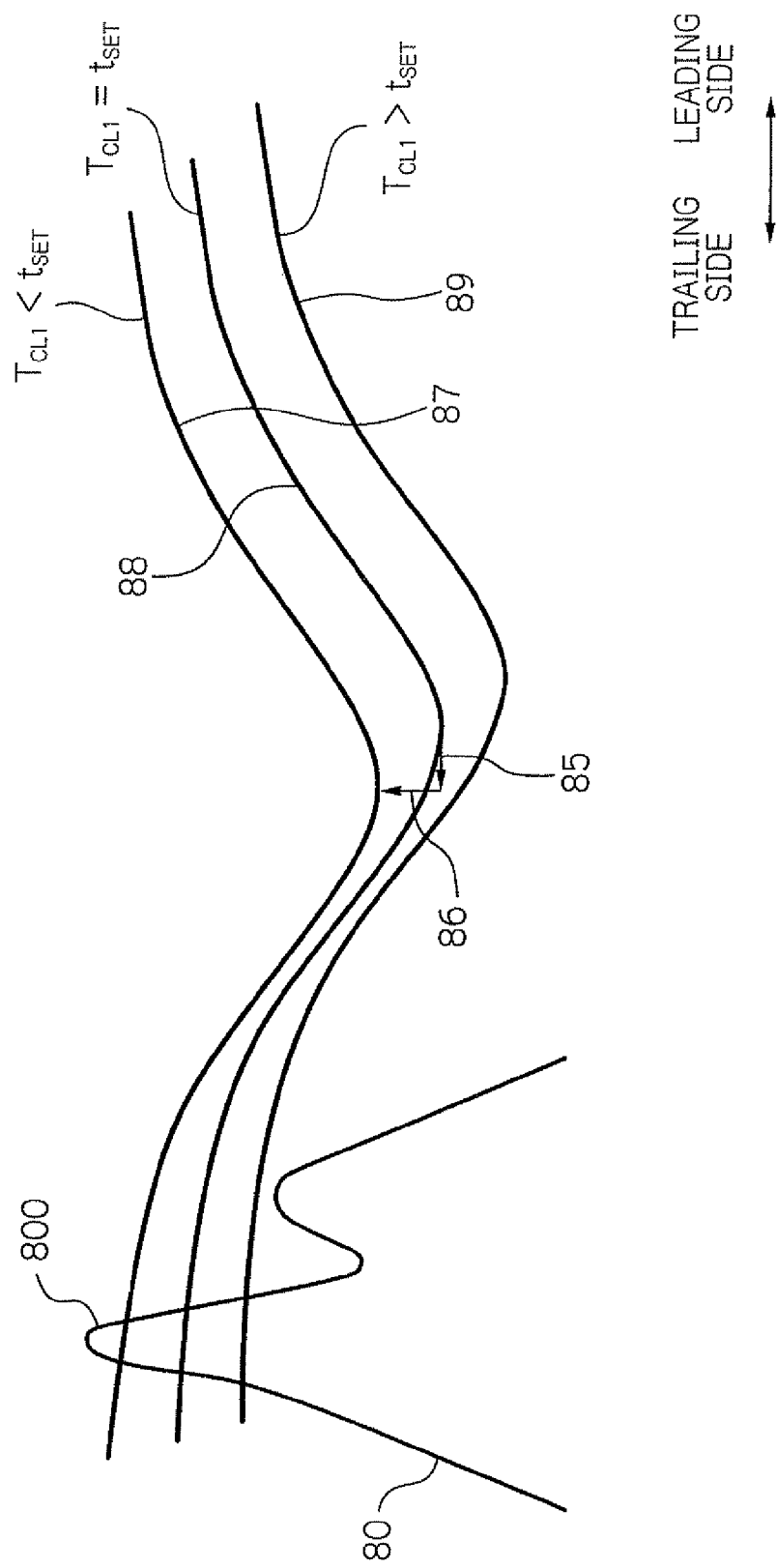
FIG. 10 shows a schematic view illustrating anisotropic field profiles, for explaining the setting of the thickness $T_{CL1}$ of the first clad layer.

FIGS. 9a and 9b show schematic views illustrating effective write field profiles and anisotropic field profiles, for explaining the principle of the thermally-assisted magnetic recording according to the present invention. Further, FIG. 10 shows a schematic view illustrating anisotropic field profiles, for explaining the setting of the thickness $T_{CL1}$ of the first clad layer. For the thermally-assisted magnetic recording explained below, there is used a thermally-assisted magnetic recording head 21 in which, as shown in FIGS. 3, 4a and 5, the end portion on the head part end surface 2210 side of the main pole tip 3400 is opposed to the trailing shield 3450 through a very narrow gap, and the spot center 3500 of the waveguide 35 is provided on the leading side from the main pole tip 3400.

As shown in FIG. 9a, in the thermally-assisted magnetic recording according to the present invention, an effective write field profile 80 has a protruded portion 800 on the trailing side (+Z side). An anisotropic field profile 81 has a shape of wider valley than an anisotropic field profile of the case of using a near-field light generator. Further, the anisotropic field profile 81 is set in such a way as to traverse (pass across) the protrude portion 800. Therefore, the effective write field profile 80 and the anisotropic field profile 81 intersect at a point 84 positioned on the trailing side of the protruded portion 800 and at a point positioned on the leading side of the portion 800.

Here, it is important to set, as a parameter, a distance $D_{MWE}$ in Z-axis direction between the spot center 3500 of laser light on the end surface 350 of the waveguide 35 and the trailing edge MPE on the end surface 3400e of the main pole tip 3400. By setting the distance $D_{MWE}$ to be an appropriate value, the anisotropic field profile 80 can be made to traverse the protruded portion 800 of the effective write field profile 80. In the case, the distance $D_{MWE}$ is required to be sufficiently small in order to make the field gradient at the cross point 84 of the anisotropic field profile 81 (temperature gradient in the recording layer 100) as large as possible so that the magnetization transition of record bits becomes steeper.

The distance $D_{MWE}$ is expressed as the above-described equation (1): $D_{MWE}=T_{MPE}+T_{CL1}+D_{CENT}$, where $D_{CENT}$ is a distance between the spot center 3500 and the upper surface 354 of the waveguide 35. In this expression, the thickness $T_{MPE}$ at the end surface 3400e of the main pole tip 3400 can be made sufficiently small by applying the tapered structure having the inclined surface 3400a in the main pole tip 3400 as shown in FIGS. 4a and 5. Further, the thickness $T_{CL1}$ of the first clad layer 384 can be made sufficiently small by making the length $L_{MP1}$ of main pole tip 3400 sufficiently small and by providing the second clad layer 50 on the rear side (+X side) from the main pole tip 3400, also as shown in FIG. 4a. Therefore, under a predetermined distance $D_{CENT}$, the distance $D_{MWE}$ can be controlled to be a sufficiently small value.

Here, it is assumed that the thickness $T_{CL1}$ of the first clad layer 384 is set to be $t_{SET}$ as shown in FIG. 10. The value of $t_{SET}$ is, for example, 50 nm, and is preferably in the range from 10 nm to 100 nm. Hereinafter, there is considered the variation in position of anisotropic field profile when changing the value of thickness $T_{CL1}$, based on anisotropic field profile 88 in the case of $T_{CL1}=t_{SET}$ as shown in FIG. 10. Anisotropic field profile 87 in the case that the thickness $T_{CL1}$ is smaller than $t_{SET}$ ($T_{CL1}<t_{SET}$) lies on the trailing side (+Z side) apart from the profile 88 by the length of arrow 85, and on the upper side apart from the profile 88 by the length of arrow 86, the shift of the profile 88 being caused by setting the first clad layer 384 thinner. The shift by the length of arrow 85 is derived from the close vicinity of the light spot to the trailing edge MPE due to the thinner first clad layer 384. Further, the shift by the length of arrow 86 corresponds to a phenomenon that the first clad layer 384 functions less as a clad due to its smaller thickness; thus a part of laser light is absorbed into the main pole tip 3400, thereby heating ability of the laser light becomes degraded.

On the other hand, anisotropic field profile 89 in the case that the thickness $T_{CL1}$ is larger than $t_{SET}$ ($T_{CL1}>t_{SET}$) lies on the opposite side to the profile 87 apart from the profile 88, the shift of the profile 89 being caused by setting the first clad layer 384 thicker. As described above, it is understood that the position of anisotropic field profile can be adjusted by changing the thickness $T_{CL1}$.

Backing to FIG. 9a, under the above-described setting, the magnetization of the magnetic recording layer 100 of the magnetic disk can be reversed in the region where the anisotropic field profile 81 underruns the effective write field profile 80 (anisotropic magnetic field $H_K$<effective write field $H_{EFF}$). A record bit 83 is formed on the magnetic recording layer 100 by reversing the direction 802 of write field, while the magnetic recording layer 100 is moving to the direction indicated by arrow 82 due to the magnetic disk rotation.

In this case, magnetization transition of the formed record bit 83 is eventually decided at the cross point 84 positioned on the trailing side of the protruded portion 800, where the field gradient is very large. Thereby, the magnetization transition regions become steeper; thus it is possible to form smaller record bit 83 and to achieve a high linear recording density. Moreover, the formed record bit 83 is moved away from the spot center 3500 of the waveguide 35; then is not exposed to higher temperature after being formed. As a result, the magnetization of record bit 83 becomes stable, which can contribute to the improvement in signal to noise ratio (SN ratio). As explained above, it is possible to form stable record bits pattern with steeper magnetization transition regions, without depending on the use of a near-field light generator, and to contribute to the improvement in both linear recording density and signal to noise ratio.

Next, with reference to FIG. 9b, limitation to the position of the cross point 84 on the trailing side of the protruded portion 800 is explained. Here, the minimum value of effective write field in the region between both edges of the effective write field profile 80 is referred as $EH_{MIN}$, and the maximum value of effective write field profile 80 in the protruded portion 800 as $EH_{MAX}$. In this case, the value $EH_{XP}$ of the effective write field at the cross point 84 on the trailing side of the protruded portion 800 preferably satisfies the following condition:

$$0.2 \times (EH_{MAX}-EH_{MIN}) <= EH_{XP}-EH_{MIN} <= 0.8 \times (EH_{MAX}-EH_{MIN}) \quad (3)$$

This condition means that the cross point 84 on the trailing side of the protruded portion 800 is preferably located in the height range from two-tenth to eight-tenth of the height of the protruded portion 800, as shown in FIG. 9b. Fulfillment of this condition effects assured improvement in signal to noise ratio.

Further, in the thermally-assisted magnetic recording of the present invention, it is preferable that the minimum value $HK_{MIN}$ of anisotropic magnetic field in the anisotropic field profile 81 satisfies the condition: $HK_{MIN}>EH_{MIN}$, as shown in FIG. 9a. The write field in the range between both edges of the profile 80 extends with some degree in the track width direction. Then, by setting the minimum value $HK_{MIN}$ of anisotropic magnetic field in the anisotropic field profile 81 to be larger than at least the minimum value $EH_{MIN}$ of effective write field, adjacent track erasure (ATE) can be prevented, which is a phenomenon that the effective write field unintentionally erases data written on the adjacent tracks.

Hereinafter, there are explained practical examples of performing the thermally-assisted magnetic recording with the use of the thermally-assisted magnetic recording head according to the present invention.

(Transmittance of Laser Light in Waveguide 35)

First, transmittance of laser light propagating through the waveguide 35 was simulated in the configuration of the waveguide 35 and the electromagnetic transducer 34 shown in FIGS. 4a and 5.

An experiment for the simulation analysis was implemented by using a three-dimensional Finite-Difference Time-Domain (FDTD) method, which is an electromagnetic field analysis technique. Laser light that entered the waveguide 35 was a Gaussian beam with a wavelength $\lambda_L$ of 650 nm, having TM polarization (in which the oscillation direction of electric field of the laser light is perpendicular to the layer surface of the waveguide 35, that is, in Z-axis direction). The output power of the laser diode 40 was 10 mW.

The waveguide 35 had a width $W_{WG1}$ and a thickness $T_{WG}$ (FIG. 6a), both of which was 500 nm, and was formed of $TaO_X$ (refractive index n=2.15). The insulating layer 383, the first clad layer 384, the second clad layer 50 and the third clad layer 51 were formed of $Al_2O_3$ (refractive index n=1.65). The thickness $T_{CL1}$ of the first clad layer 384 was set to be each of 10 nm, 50 nm, 100 nm and 200 nm as a parameter that influences the transmittance. The thicknesses $T_{CL2}$ and $T_{CL3}$ of the second and third clad layers 50 and 51 were 100 nm and 400 nm, respectively. Further, the main pole tip 3400 and the main pole body 3401 were formed of FeNi. The real part of refractive index of FeNi was 2.92 and the imaginary part was 4.18. The length $L_{MP1}$ (FIGS. 4a and 5) of the main pole tip 3400 was varied in the range from 0 to 10 μm to be set as another parameter that influences the transmittance. The portions of the main pole tip 3400 and main pole body 3401 overlapped with each other has a length in X-axis direction of 1 μm.

The thickness $T_{MP1}$ of the main pole tip 3400 was 0.2 μm, the thickness $T_{MPE}$ on the head part end surface 2210 was 0.1 μm, and the width $W_P$ in the track width direction was 100 nm. Further, the length $L_{MP1}$ of the main pole tip 3400 was 3 μm, and the thickness $T_{CL1}$ of the first clad layer was 50 nm. The distance $D_{MWE}$ between the spot center 3500 on the end surface 350 of the waveguide 35 and the trailing edge MPE of the end surface 3400e of the main pole tip 3400 was 0.4 μm, as the total of 0.1 μm of the thickness $T_{MPE}$, 0.05 μm of the thickness $T_{CL1}$, and 0.25 μm of the distance $D_{CENT}$.

Figure 11:
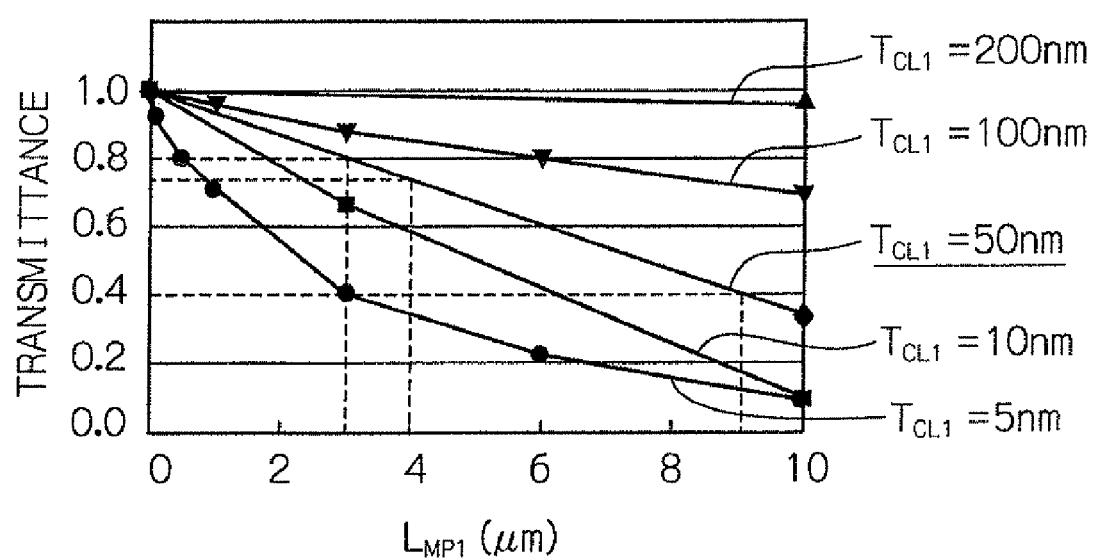
FIG. 11 shows a graph illustrating the simulation result of the transmittance of laser light in the waveguide.

FIG. 11 shows a graph illustrating the simulation result of the transmittance of laser light in the waveguide 35. The transverse axis of the graph corresponds to the length $L_{MP1}$ of the main pole tip 3400, and the vertical axis is transmittance T. The transmittance T was calculated by using the definition: $T=I_{OUT}/I_{IN}$, where $I_{IN}$ was the intensity of laser light incident on the end surface 352 of the waveguide 35, and $I_{OUT}$ was the intensity of laser light emitted from the end surface 350 of the waveguide 35.

As shown in FIG. 11, in every case of the thicknesses $T_{CL1}$ of the first clad layer 384, the transmittance T shows a tendency to decrease as the length $L_{MP1}$ of the main pole tip 3400 increases. Here, considered is the case that the thickness $T_{CL1}$ of the first clad layer 384 is 50 nm, which is in the preferable range for $T_{CL1}$. In this case, the transmittance T shows a favorable value in the range from 75 to 80%, under the condition that the length $L_{MP1}$ of the main pole tip 3400 is in the range from 3 to 4 μm, which is a preferable range for $L_{MP1}$. On the contrary, the transmittance T is 40% when the length $L_{MP1}$ is 9 μm. This reduction is thought to be because, the larger the length $L_{MP1}$ becomes, the more the laser light propagating through the waveguide 35 is absorbed into the main pole tip 3400. Therefore, it is understood that setting the length $L_{MP1}$ of the main pole tip 3400 to be in the range from 3 to 4 μm is also preferable from a standpoint of transmittance T.

(Effective Write Field Profile)

Next, an effective write field profile was simulated, which was realized in the configuration of the electromagnetic transducer 34 shown in FIGS. 4a and 5. The method of the simulation and the configuration of the electromagnetic transducer 34 were the same as the above-described one.

Table 1 shows the relation in the present practical example between: the length $L_{MP1}$ of the main pole tip 3400; and the effective write field and its field gradient. In the table, $I_W$ indicates the amount of write current applied to the write coil layer 343. And the write field components $H_P$ and $H_T$, and the field gradient show values at the center position in the stacking direction (X-axis direction) within the magnetic recording layer 100 of the magnetic disk 10 located directly below the trailing edge MPE of the main pole tip 3400. Further, the effective write field $H_{EFF}$ was calculated by using the above-described expression (2): $H_{EFF}=((H_P^2+H_T^2)^{1/3}+H_L^{2/3})^{3/2}$.

TABLE 1

| $L_{MP1}$ | $I_W$ | Write field (Oe) | | | Field gradient (Oe/nm) | | |
|---|---|---|---|---|---|---|---|
| (μm) | (mA) | $H_T$ | $H_P$ | $H_{EFF}$ | $H_T$ | $H_P$ | $H_{EFF}$ |
| 3 | 40 | 6918 | 6110 | 14718 | 259 | 149 | 529 |
| 5 | 40 | 6929 | 6101 | 14708 | 258 | 150 | 528 |
| 9 | 40 | 6933 | 6174 | 14782 | 260 | 150 | 537 |

Figure 12A:
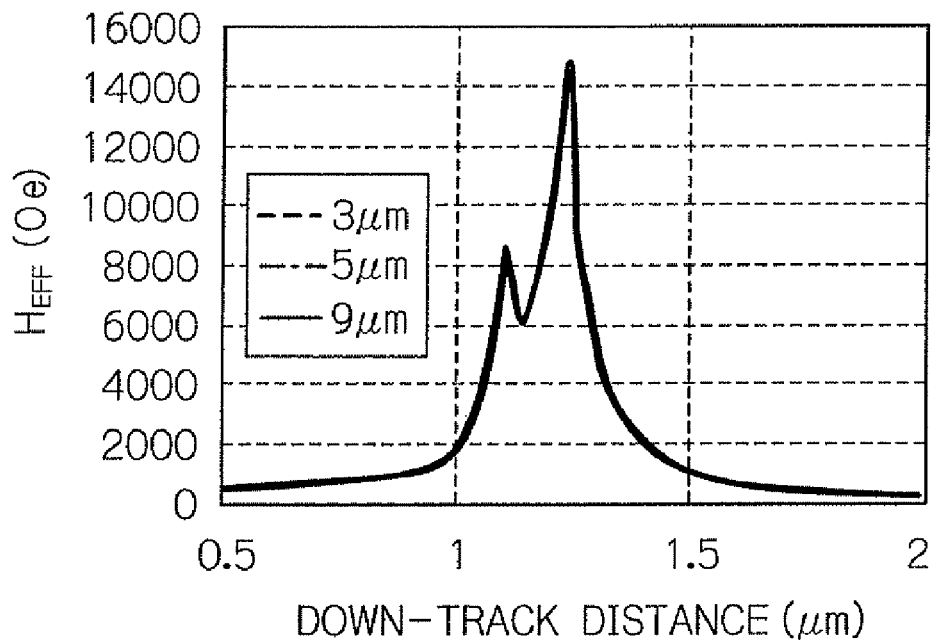
FIGS. 12a and 12b show graphs illustrating profiles of the effective write field $H_{EFF}$ in the present practical example, in the direction along the track and in the direction traversing the track, respectively.
Figure 12B:
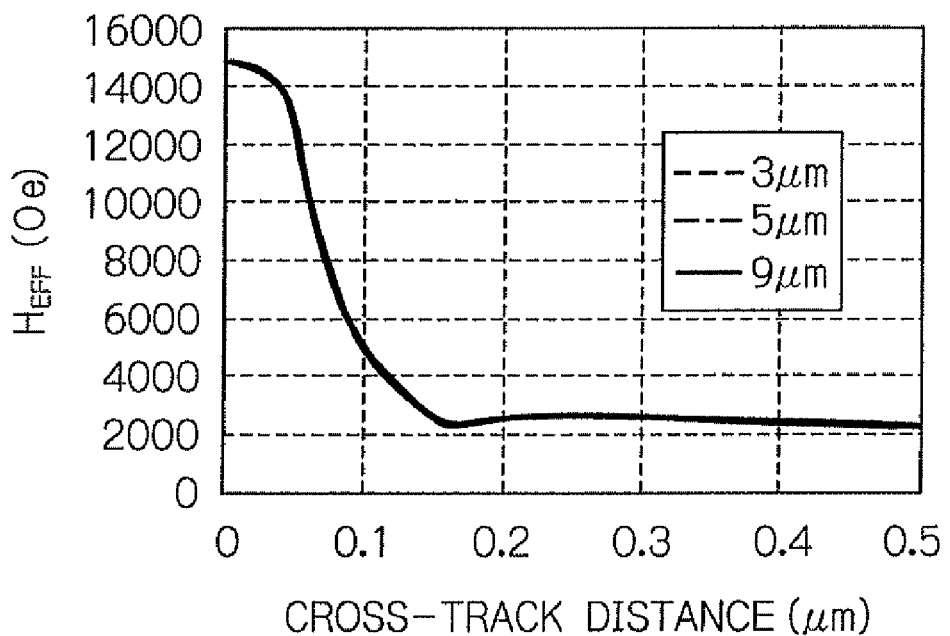

Further, FIGS. 12a and 12b show graphs illustrating profiles of the effective write field $H_{EFF}$ in the present practical example, in the direction along the track and in the direction traversing the track, respectively.

According to FIGS. 12a and 12b and Table 1, both profiles of the effective write field $H_{EFF}$ in the direction along the track and in the direction traversing the track have favorable shapes that are almost invariable independently of the length $L_{MP1}$ of the main pole tip 3400 in the range from 3 to 9 μm. That is, even in the case that the length $L_{MP1}$ is in the range from 3 to 4 μm, the sufficient intensities of effective write field and field gradient can be obtained, which are almost equal to those in the case that the length $L_{MP1}$ is 9 μm which is sufficiently large to obtain the sufficient intensity of effective write field $H_{EFF}$.

As described above, in the main pole tip 3400, the thickness $T_{MP1}$ was 0.2 μm, and the thickness $T_{MPE}$ was 0.1 μm. That is, the end portion on the head part end surface 2210 side of the main pole tip 3400 has an inclined surface 3400a, and was tapered in Z-axis direction. Compared to this shape, the intensity of effective write field $H_{EFF}$ was simulated in a head in which the thickness of the main pole tip 3400 was 0.1 μm overall; thus, the end portion was not tapered. The simulation result in the non-tapered case was that the intensity of effective write field $H_{EFF}$ was decreased to approximately 60%. As a result, it is understood that the tapered structure in Z-axis direction of the end portion of the main pole tip 3400 functions effectively for retaining the intensity of effective write field $H_{EFF}$.

(Recording and Reproducing Characteristics)

Lastly, there is shown a practical example of actually performing the thermally-assisted magnetic recording with use of the thermally-assisted magnetic recording head 21 including the waveguide 35 and electromagnetic transducer 34 shown in FIGS. 4a and 5.

In the practical example, the structure of the electromagnetic transducer 34 was the same as the above-described one.

Further, the traveling linear speed due to the rotation of the magnetic disk 10 was 1.5 m/s (meter/sec). The magnetic spacing was 6 nm, which was a distance between the surface of magnetic recording layer and the ends of MR element 33 and electromagnetic transducer 34. The magnetic recording medium used in the present example was a magnetic disk in which sequentially stacked on a glass substrate are: a soft-magnetic under layer with thickness of 20 nm; an intermediate layer with thickness of 5 nm; and a magnetic recording layer with thickness of 10 nm. The average value of grain sizes of the magnetic recording layer was 4 nm. The magnetic anisotropy energy $K_U$ was $2\times10^7$ erg/cc, and the anisotropic magnetic field $H_K$ was 40 kOe at room temperature. Further, the output of laser diode 40 was 8 mV. The wavelength $\lambda_L$ of laser light was 650 nm. The diameter of the light spot of laser light emitted from the waveguide 35 was 500 nm.

Table 2 shows linear recording densities obtained in the recording and reproducing operations of the present practical example and a comparative example. Here, in the comparative example, magnetic recording was performed by using the same head and apparatus as those having the above-described configuration except that the length $L_{MP1}$ of main pole tip 3400 was 9 μm and $T_{MP1}$ was 0.2 μm; the end portion of the tip 3400 has no inclined surface 3400a and thus was not tapered in the stacking direction (Z-axis direction).

TABLE 2

|  | Linear recording density (kFCI) |
|---|---|
| Comparative example | 1600 |
| Practical example | 1900 |

As shown in Table 2, in the present practical example, large linear recording density of 1900 kFCI (Flux Change per Inch) was obtained by using the thermally-assisted magnetic recording in which the laser diode 40 was actually driven under the above-described condition. It is understood that the linear recording density of the present practical example has been improved by 20% compared to the linear recording density (1600 kFCI) of the comparative example in which the length $L_{MP1}$ of the main pole tip 3400 was 9 μm. Here, According to FIGS. 12a and 12b and Table 1, the intensity of effective write field and the field gradient in the case of $L_{MP1}=3$ μm were almost equivalent to those in the case of $L_{MP1}=9$ μm. Therefore, it is understood that this improvement of linear recording density in the present practical example has been derived from the structure in which the main pole tip 3400 with sufficiently small length $L_{MP1}$ was provided and was made to have an inclined surface 3400a; thus the end portion of the tip 3400 was tapered in the stacking direction (Z-axis direction).

As understood from the above-described examples, according to the present invention, it is possible to perform favorable thermally-assisted magnetic recording without depending on the use of a near-field light generator, in which the absorption of light propagating through the waveguide by the main magnetic pole is suppressed sufficiently. Further, it is possible to form stable record bits pattern having steep magnetization transition regions without depending on the use of a near-field light generator.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thermally-assisted magnetic recording head comprising:
   a waveguide for guiding a light for thermal-assist to a magnetic recording medium, formed on an element-formation surface of a substrate and extending to an opposed-to-medium surface of the head; and
   a write head element formed on a trailing side from the waveguide and comprising: a main magnetic pole for applying a write magnetic field to the magnetic recording medium; and an auxiliary magnetic pole provided on a trailing side of the main magnetic pole,
   the main magnetic pole comprising: a first main pole extending to the opposed-to-medium surface; and a second main pole provided on an end portion of the first main pole, the end portion being on an opposite side to the opposed-to-medium surface, and
   the waveguide and the first main pole being opposed to each other through a first clad layer that acts as a clad for propagation of the light, and a second clad layer that acts as a clad for propagation of the light being provided on the first clad layer and on a rear side from the first main pole when viewed from the opposed-to-medium surface side.

2. The thermally-assisted magnetic recording head as claimed in claim 1, wherein a length of the first main pole in a direction perpendicular to the opposed-to-medium surface is 3 micrometers or more, and 4 micrometers or less.

3. The thermally-assisted magnetic recording head as claimed in claim 1, wherein a thickness of the first clad layer is 10 nanometers or more, and 100 nanometers or less.

4. The thermally-assisted magnetic recording head as claimed in claim 1, wherein a third clad layer is provided between the second clad layer and the second main pole.

5. The thermally-assisted magnetic recording head as claimed in claim 4, wherein a thickness of the third clad layer is at least 0.4 micrometer.

6. The thermally-assisted magnetic recording head as claimed in claim 4, wherein an end of the third clad layer on the opposed-to-medium surface side is recessed by a predetermined distance from an end of the first main pole when viewed from the opposed-to-medium surface side, the end of the first main pole being on an opposite side to the opposed-to-medium surface.

7. The thermally-assisted magnetic recording head as claimed in claim 6, wherein the predetermined distance is 1 micrometer or more, and 2 micrometers or less.

8. The thermally-assisted magnetic recording head as claimed in claim 1, wherein an end portion of the first main pole on the opposed-to-medium surface side has a width in a track width direction smaller than those of the other portions, and is tapered in a stacking direction in such a way as to have an inclined surface reaching the opposed-to-medium surface on a trailing side of the end portion.

9. The thermally-assisted magnetic recording head as claimed in claim 1, wherein an effective write field profile has a protruded portion on a trailing side, the effective write field profile being an intensity distribution of the write magnetic field generated from the first main pole, with respect to positions along a track in a recording layer of the magnetic recording medium, and
   wherein an anisotropic field profile traverses the protruded portion of the effective write field profile, the anisotropic field profile being a distribution of anisotropic magnetic field with respect to positions along a track in the recording layer when a portion of the recording layer is irradiated directly with light emitted from the waveguide; thus an anisotropic magnetic field of the portion is decreased.

10. The thermally-assisted magnetic recording head as claimed in claim 9, wherein a minimum value $HK_{MIN}$ of anisotropic magnetic field in the anisotropic field profile satisfies a condition: $HK_{MIN} > EH_{MIN}$, where $EH_{MIN}$ is a minimum value of write magnetic field in a range between both edges of the write field profile.

11. The thermally-assisted magnetic recording head as claimed in claim 1, wherein a light source for emitting the light for thermal-assist is provided on or near an end surface of the waveguide on an opposite side to the opposed-to-medium surface.

12. A head gimbal assembly comprising a suspension and a thermally-assisted magnetic recording head as claimed in claim 1 fixed on the suspension.

13. A magnetic recording apparatus comprising:
at least one head gimbal assembly comprising a suspension and a thermally-assisted magnetic recording head fixed on the suspension;
at least one magnetic recording medium; and
a recording circuit for controlling write operations which the thermally-assisted magnetic recording head performs to the magnetic recording medium,
the thermally-assisted magnetic recording head comprising:
a waveguide for guiding a light for thermal-assist to the magnetic recording medium, formed on an element-formation surface of a substrate and extending to an opposed-to-medium surface of the head; and
a write head element formed on a trailing side from the waveguide and comprising: a main magnetic pole for applying a write magnetic field to the magnetic recording medium; and an auxiliary magnetic pole provided on a trailing side of the main magnetic pole,
the main magnetic pole comprising: a first main pole extending to the opposed-to-medium surface; and a second main pole provided on an end portion of the first main pole, the end portion being on an opposite side to the opposed-to-medium surface,
the waveguide and the first main pole being opposed to each other through a first clad layer that acts as a clad for propagation of the light, and a second clad layer that acts as a clad for propagation of the light being provided on the first clad layer and on a rear side from the first main pole when viewed from the opposed-to-medium surface side, and
the recording circuit further comprising a light-emission control circuit for controlling operations of emitting the light.

14. The magnetic recording apparatus as claimed in claim 13, wherein a third clad layer is provided between the second clad layer and the second main pole.

15. The magnetic recording apparatus as claimed in claim 14, wherein an end of the third clad layer on the opposed-to-medium surface side is recessed by a predetermined distance from an end of the first main pole when viewed from the opposed-to-medium surface side, the end of the first main pole being on an opposite side to the opposed-to-medium surface.

16. The magnetic recording apparatus as claimed in claim 13, wherein an end portion of the first main pole on the opposed-to-medium surface side has a width in a track width direction smaller than those of the other portions, and is tapered in a stacking direction in such a way as to have an inclined surface reaching the opposed-to-medium surface on a trailing side of the end portion.

17. The magnetic recording apparatus as claimed in claim 13, wherein an effective write field profile has a protruded portion on a trailing side, the effective write field profile being an intensity distribution of the write magnetic field generated from the first main pole, with respect to positions along a track in a recording layer of the magnetic recording medium, and
wherein an anisotropic field profile traverses the protruded portion of the effective write field profile, the anisotropic field profile being a distribution of anisotropic magnetic field with respect to positions along a track in the recording layer when a portion of the recording layer is irradiated directly with light emitted from the waveguide; thus an anisotropic magnetic field of the portion is decreased.

18. The magnetic recording apparatus as claimed in claim 17, wherein a minimum value $HK_{MIN}$ of anisotropic magnetic field in the anisotropic field profile satisfies a condition: $HK_{MIN} > EH_{MIN}$, where $EH_{MIN}$ is a minimum value of write magnetic field in a range between both edges of the write field profile.

19. The magnetic recording apparatus as claimed in claim 13, wherein a light source is provided which supplies the light for thermal-assist to an end surface of the waveguide on an opposite side to the opposed-to-medium surface.

* * * * *